United States Patent Office 3,117,139
Patented Jan. 7, 1964

3,117,139
4-ARYL-1-CARBAMYLALKYL-PIPERIDINES
Aram Mooradian, Schodack, N.Y., assignor to Sterling Drug Inc., New York, N.Y., a corporation of Delaware
No Drawing. Filed Apr. 22, 1960, Ser. No. 23,928
Claims priority, application Great Britain Apr. 23, 1959
18 Claims. (Cl. 260—294.3)

This invention relates to compositions of matter of the class of substituted piperidines, to processes for making such compositions, and to intermediates for use in said processes.

This application is a continuation-in-part of my application Serial Number 731,897, filed April 30, 1958.

Piperidines having a lower-aryl substituent attached to the 4-position carbon atom of the piperidine or tetrahydropyridine ring are known in the art. Also known are such 4-(lower-aryl)-piperidines having lower-carbalkoxy, lower-carboxylic-acyl, lower-carboxylic-acyloxy or hydroxy as second substituents attached to the 4-position carbon atom of the piperidine ring. Such substituted piperidines are also known in which one or more lower-aliphatic hydrocarbon radicals are attached to other carbon atoms of the piperidine ring.

It is an object of the present invention to provide useful compositions containing the aforesaid types of substituted-piperidine moiety in combination with substituents of a character novel in the 1-position of the piperidine ring.

The present invention, in its composition aspect, is described as residing in the concept of a composition having a molecular structure in which a carbamyl-(polycarbon-lower-alkyl) radical is attached to the ring-nitrogen atom of 4-(lower-aryl)-4-Z-piperidine where Z is lower-carbalkoxy, lower-carboxylic-acyl, lower-carboxylic-acyloxy or hydrogen and where the carbamyl nitrogen atom is optionally substituted by from one to two radicals selected from the group consisting of lower-aliphatic, lower-aryl, lower-aryl-alkyl, lower-cycloalkyl and lower-cycloalkylalkyl radicals and where the carbamyl nitrogen is optionally part of a saturated N-heteromonocyclic radical having five to six ring atoms.

The physical embodiments of my invention have been tested by standard pharmacological evaluation procedures in cats and found to possess antitussive activity. A subgeneric group of the compositions within my generic concept, i.e., those substances wherein the carbamyl nitrogen atom is substituted by at least one lower-aromatic radical or by two lower-alkyl radicals or wherein the carbamyl nitrogen is part of a saturated N-hetero-monocyclic radical, have analgesic activity, as determined by standard pharmacological evaluation procedures in rats.

The term "lower-carboxylic-acyl," as used herein, means carboxylic acyl radicals having from two to seven carbon atoms, inclusive, and is illustrated by ethanoyl (acetyl), propanoyl (propionyl), n-butanoyl (butyryl), 2-methylpropanoyl, n-pentanoyl, n-hexanoyl, n-heptanoyl, 2-propenoyl (acrylyl), 2-methylpropenoyl, 2-butenoyl, methoxyacetyl, ethoxyacetyl, n-propoxyacetyl, 3-methoxypropanoyl, 3-carboxypropanoyl, 4-carboxybutanoyl, and the like.

The term "lower-carbalkoxy," as used herein, means carbalkoxy radicals having from two to seven carbon atoms, inclusive, and is illustrated by carbomethoxy (—COOCH$_3$), carbethoxy (—COOCH$_2$CH$_3$), carbo-n-propoxy, carbisopropoxy, carbo-2-butoxy, carbo-n-butoxy, carbo-n-pentoxy, carbo-n-hexoxy, and the like.

The term "lower-aryl," as used herein, means radicals having one or two aromatic rings which can be benzenoid or five- or six-membered heteroaromatic, as illustrated by phenyl, naphthyl, biphenylyl, pyridyl, pyrimidyl, furyl, thiazolyl, oxazolyl, triazinyl, thienyl, and the like. Preferred embodiments have as "lower-aryl" monocarbocyclic-aryl radicals having six ring-carbon atoms, that is, aryl radicals of the benzene series. These embodiments, which are preferred primarily because of their commercial practicability due to availability of intermediates, include compounds where "lower-aryl" is the unsubstituted phenyl radical and phenyl radicals substituted by low-molecular weight substituents such as lower-alkyl, lower-alkoxy, lower-alkylmercapto, lower-alkylsulfonyl, halo, lower-alkylamino, di-(lower-alkyl)amino, nitro, amino, lower-carboxylic-acylamino, trifluoromethyl, phenoxy, benzyloxy, hydroxy, phenylmercapto, benzyl, 4-methoxyphenoxy, and the like. The substituted phenyl radicals have preferably from one to three substituents which can be in any of the available positions of the phenyl nucleus, and where more than one substituent is present, they can be the same or different and they can be in any of the various position combinations relative to each other. The lower-alkyl, lower-alkoxy, lower-alkylmercapto, lower-alkylsulfinyl, lower-alkylsulfonyl, lower-alkylamino, lower-carboxylic-acylamino, and the like substituents have preferably from one to six carbon atoms which can be arranged as straight or branched chains, and are illustrated by methyl, ethyl, n-hexyl, methoxy, isobutoxy, ethylmercapto, n-amylmercapto, methylsulfinyl, n-propylsulfinyl, isopropylsulfonyl, n-butylsulfonyl, ethylamino, n-butylamino, acetylamino, propionylamino, and the like.

The term "lower-aryl-alkyl," as used herein means "lower-aryl" radicals attached to one of the two available linkages of a "lower-alkylene" radical and is illustrated by benzyl, 2-pyridylmethyl, phenethyl, 2-(4-methoxyphenyl)ethyl, 3-(4-acetylaminophenyl)propyl, 3-(2-methyl-4-pyridyl)propyl, 1-phenyl-2-propyl, 4-(2-thienyl)butyl, and the like.

The term "polycarbon-lower-alkylene" or "substituted-polycarbon-lower-alkyl," as used herein, means alkylene radicals having from two to six carbon atoms, inclusive, and is illustrated by —CH$_2$CH$_2$—, —CH(CH$_3$)CH$_2$—
—CH$_2$CH$_2$CH$_2$CH$_2$—, —CH$_2$CH$_2$CH$_2$CH$_2$CH$_2$—

$$-\text{CH}_2\overset{|}{\text{C}}\text{HCH}_3$$

—CH$_2$CH$_2$CH$_2$—, —C(CH$_3$)$_2$CH$_2$—

$$-\text{CH}_2\overset{|}{\text{C}}\text{HCH}_2\text{CH}_3$$

—CH(CH$_3$)CH$_2$CH$_2$—, —CH$_2$CH$_2$CH$_2$CH$_2$CH$_2$CH$_2$—, and the like.

The term "lower-alkyl," as used herein, means alkyl radicals having from one to six carbon atoms, inclusive, and is illustrated by methyl, ethyl, n-propyl, isopropyl, n-butyl, isobutyl, 2-butyl, n-amyl, n-hexyl, and the like.

The term "lower-aliphatic," as used herein, is meant to encompass "lower-alkyl" radicals as defined above as well as "lower-alkenyl" and "lower-alkynyl" radicals. The term "lower-alkenyl" means alkenyl radicals having from three to six carbon atoms, inclusive, and is illustrated by allyl (2-propenyl), methallyl (2-methyl-2-propenyl), 2-butenyl, 3-hexenyl, and the like. The term "lower-alkynyl" means alkynyl radicals having from three to six carbon atoms, inclusive, and is illustrated by propargyl (2-propynyl), 2-butynyl, 3-hexynyl, and the like.

The term "lower-cycloalkyl," as used herein, means cycloalkyl radicals having from three to eight ring-carbon atoms, inclusive, and is illustrated by cyclopropyl, cyclobutyl, cyclopentyl, cyclohexyl, 2-methylcyclohexyl, cycloheptyl, cyclooctyl, and the like.

The term "lower-cycloalkylalkyl," as used herein, means "lower-cycloalkyl" radicals attached to one of the two available linkages of a "lower-alkylene" radical and is illustrated by cyclopropylmethyl, 3-cyclopentylpropyl, 2-cyclohexylethyl, cyclohexylmethyl, and the like.

The term "saturated N-heteromonocyclic," as used herein, means saturated cyclic radicals having from five to six ring atoms including at least one ring-nitrogen atom, having its connecting linkage on said ring-nitrogen atom and optionally having lower-alkyl ring substituents, and is illustrated by 1-piperidyl, 2-methyl-1-piperidyl, 3-ethyl-1-piperidyl, 4-methyl-1-piperidyl, 2,6-dimethyl-1-piperidyl, 1-pyrrolidyl, 2-methyl-1-pyrrolidyl, 3-ethyl-1-pyrrolidyl, 2,5-dimethyl-1-pyrrolidyl, 4-morpholinyl, 4-thiomorpholinyl, 1-piperazinyl, 4-methyl-1-piperazinyl, 4-ethyl-1-piperazinyl, 2,4,6-trimethyl-1-piperazinyl, and the like.

Embodiments of my invention in its composition aspect that are preferred because of their commercial practicability due to availability of intermediates are the 1-[carbamyl-(polycarbon-lower-alkyl)]-piperidines having in free base form the structural formula I

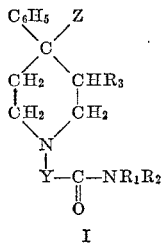

where Z represents hydrogen, hydroxyl, lower-alkanoyl, lower-alkanoyloxy or lower-carbalkoxy, $R_3$ represents hydrogen or lower-alkyl, Y represents polycarbon-lower-alkylene having its connecting linkages to the ring nitrogen atom and carbonyl carbon atom on different carbon atoms, and $R_1$ and $R_2$ represent hydrogen, lower-alkyl, lower-cycloalkyl, lower-monocarbocyclic-aryl, (lower-monocarbocyclic-aryl)-(lower-alkyl), and where $NR_1R_2$ represents saturated N-heteromonocyclic radicals having five to six ring atoms. The term "$C_6H_5$," as used above and herein, means the phenyl radical.

The inventon, in its process aspect, is described as residing in the concept of reacting a 4-(lower-aryl)-4-(lower-carbalkoxy, lower-carboxylic-acyl, hydroxy or unsubstituted)-piperidine with a carbamyl-(polycarbon-lower-alkylating) agent. For the preparation of the compounds where the polycarbon-lower-alkylene radical has its connecting linkages on adjacent carbon atoms (as represented by Y in Formula I above), that is, an alpha, beta-lower-alkylene radical, the carbamyl-(polycarbon-lower-alkylating) agent for preferred embodiments is an acrylamide having the formula $C(R)_2=C(R)CONR_1R_2$ where $R_1$ and $R_2$ have the meanings designated hereinabove and R represents hydrogen or a lower-alkyl radical. For example, the reaction of ethyl-4-phenylpiperidine-4-carboxylate with acrylamide ($R=R_1=R_2=$hydrogen), methacrylamide (2-methyl-2-propenamide) or N-methyl-N-phenylacrylamide (R=hydrogen, $R_1$=methyl, $R_2$=phenyl) yields, respectively, ethyl 1-(2-carbamylethyl)-4-phenylpiperidine-4-carboxylate, ethyl 1-(2-carbamylpropyl)-4-phenylpiperidine-4-carboxylate or ethyl 1-[2-(N-methyl-N-phenylcarbamyl)ethyl]-4-phenylpiperidine-4-carboxylate. The reaction is generally carried out at a temperature between about 50° C. and 150° C., preferably by heating on a steam bath, either without or with an inert solvent, e.g., tertiary-butanol.

Alternatively, the compounds of my invention can be prepared by using as the carbamyl-(polycarbon-lower-alkylating) agent a carbamyl-(polycarbon-lower-alkyl) halide having, for example, for preferred embodiments, the formula $X-Y-CONR_1R_2$ where Y, $R_1$ and $R_2$ have the meanings designated hereinabove and X is a halo radical, preferably chloro, bromo or iodo. As an illustration of this procedure, ethyl 1-(4-carbamylbutyl)-4-phenylpiperidine-4-carboxylate is formed by reacting ethyl 4-phenylpiperidine-4-carboxylate with 4-carbamylbutyl chloride, bromide or iodide; similarly, following the same procedure but using 4-n-propanoyl-4-phenylpiperidine, 4-phenyl-4-piperidinol, the product obtained is, respectively, 1-(4-carbamylbutyl)-4-phenyl-4-n-propanoylpiperidine or 1-(4-carbamylbutyl)-4-phenyl-4-piperidinol. As above, this reaction is preferably run by heating the reactants, with or without an appropriate solvent inert under the reaction conditions, at a temperature between about 50° C. and 150° C.

An alternative procedure for the preparation of my compounds where carbamyl is unsubstituted, e.g., the preferred compounds of Formula I where $R_1$ and $R_2$ represent hydrogen, consists of first reacting a 4-(lower-aryl)-4-(lower-carbalkoxy, lower-carboxylic-acyl, hydroxy or unsubstituted)-piperidine with a cyanoalkyl halide having, e.g., for preferred embodiments, the formula $X-Y-CN$ where X and Y have the meanings given above, and then hydrolyzing the resulting corresponding 1-(cyanoalkyl)-4-(lower-aryl)-piperidine under acidic conditions to yield the corresponding 1-(carbamylalkyl) compound. Illustrative of this procedure is the reaction of ethyl 4-phenylpiperidine-4-carboxylate with 5-cyanopentyl bromide to form ethyl 1-(5-cyanopentyl)-4-phenylpiperidine-4-carboxylate which is then hydrolyzed by treatment with concentrated sulfuric acid at room temperature to yield ethyl 1-(5-carbamylpentyl)-4-phenylpiperidine-4-carboxylate.

The intermediate 4-(lower-aryl)-4-(lower-carbalkoxy, lower-carboxylic-acyl, hydroxy or unsubstituted)-1-unsubstituted-piperidines are generally known compounds which are prepared by known procedures, e.g., U.S. Patent 2,167,351, U.S. Patent 2,425,722.

In a particular process aspect the invention is described as residing in the concept of reacting the above described 1-[carbamyl-(polycarbon-lower-alkyl] - 4 - (lower-aryl)-4-piperidinols with a lower-carboxylic-acylating agent to form the corresponding 1-[carbamyl-(polycarbon-lower-alkyl)]-4-(lower-aryl) - 4 - (lower-carboxylic-acyloxy)-piperidines. The acylation is carried out preferably in a dry inert solvent, e.g., chloroform, at about room temperature using a lower-carboxylic-acyl halide as the acylating agent and using said 4-piperidinol in free base form. Alternatively, higher temperatures up to about 70° C. can be used. Also, the acylation can be run using the corresponding lower-carboxylic-acyl anhydride as the acylating agent and the 4-piperidinol in the form of its acid-addition salt, e.g., hydrochloride.

My 1 - [carbamyl-(polycarbon-lower-alkyl)]-4-(lower-aryl)-4-(lower-carbalkoxy, lower-carboxylic-acyl, lower-carboxylic-acyloxy or unsubstituted)-piperidines are useful in the free base form or in the form of acid-addition salts; and both forms are within the purview of the invention, and, in fact, are considered to be one and the same invention. The acid-addition salts are simply a more convenient form for use; and, in practice, use of the salt form inherently amounts to use of the base form. As used in the appended claims, the term "1-[carbamyl-(polycarbon-lower-alkyl)]-4-(lower aryl)-4-Z-piperidines or terms subgeneric thereto means both the free base form and the acid-addition salt form of the molecular structure recited. The acids which can be used to prepare the acid-addition salts are preferably those which produce, when combined with the free base, pharmacologically acceptable salts, that is, salts whose anions are relatively innocuous to the animal organism in pharmacological doses of the salts, so that the beneficial physiological properties inherent in the free base are not vitiated by side effects ascribable to the anions; in other words, the latter do not substantially affect the pharmacological properties inherent in the cations. In practicing my invention, I found it convenient to form the hydrochloride or ethanesulfonate salt. However, other appropriate pharmacologically acceptable salts within the scope of the invention are those derived from mineral acids such as hydrobromic acid, hydriodic acid, nitric acid, phosphoric acid, sulfamic acid, and sulfuric acid; and organic acids such as acetic acid, citric acid, tartaric acid, lactic acid, methanesulfonic acid, quinic acid, and the like, giving the hydrobromide, hydroiodide, nitrate, phosphate, sulfamate, sulfate, acetate, citrate, tartrate, lactate, methanesulfonate and quinate, respectively.

The acid-addition salts are prepared either by dissolving the free base in aqueous solution containing the appropriate acid and isolating the salt by evaporating the solution, or by reacting the free base and acid in an organic solvent, in which case the salt separates directly or can be obtained by concentration of the solution.

Although pharmacologically acceptable salts are preferred, all acid-addition salts are within the scope of my invention. All acid-addition salts are useful as sources of the free base form even if the particular salt per se is not desired as the final product, as for example when the salt is formed only for purposes of purification or identification, or when it is used as an intermediate in preparing a pharmacologically acceptable salt by ion exchange procedures.

Another aspect of my invention resides in the above mentioned intermediate 1-[cyano-(polycarbon-lower-alkyl)]-4-(lower-aryl)-4-(lower-carbalkoxy, lower - carboxylic-acyl or unsubstituted)-piperidines in the form of their free bases and their acid-addition salts. Among the compounds of this aspect of my invention are the preferred embodiments which in free base form has the structural Formula II

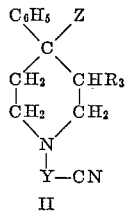

II where $R_3$ and Y are defined as above for Formula I, and Z represents lower-carbalkoxy, lower-carboxylic-acyl, hydroxy or hydrogen. These compounds can be prepared as described above by the reaction of the corresponding 4-(lower-aryl)-piperidine with a cyanoalkyl halide of the formula X—Y—CN; alternatively, the compounds where Y is an alpha, beta-alkylene radical can be prepared by reacting the corresponding 4-(lower-aromatic)-piperidine with an acrylonitrile having, e.g., for preferred embodiments the formula $C(R)_2=C(R)CN$ where R represents hydrogen or lower-alkyl as defined hereinabove. Also within the purview of this aspect of the invention are acid-addition salts of the above-1-(cyanoalkyl) intermediates including salts like those defined and illustrated above for the corresponding 1-(carbamylalkyl) compounds. As used in the appended claims, the term "1-[cyano-(polycarbon-lower-alkyl)]-4-(lower-aromatic)-4-Z-piperidines" or terms subgeneric thereto means both the free base form and the acid-addition salt form of the molecular structure recited.

The molecular structures of the compounds of my invention are established by their mode of synthesis and corroborated by the correspondence of calculated and found values for the elementary analyses for the representative examples.

The following examples will further illustrate the invention without, however, limiting it thereto.

EXAMPLE 1

*Ethyl 1-(2-Carbamylethyl)-4-Phenylpiperidine-4-Carboxylate*

A 26.9 g. portion of ethyl 4-phenylpiperidine-4-carboxylate hydrochloride was covered with ether and the mixture shakened well with 45 cc. of 10% aqueous sodium hydroxide solution. To the ether layer containing ethyl 4-phenylpiperidine-4-carboxylate was added 7.1 g. of acrylamide. The resulting mixture was heated on a steam bath in vacuo to remove the ether and then heating on a steam bath was continued for about one hour at which time the reaction mixture solidified. The solid was dissolved in about 300 cc. of hot isopropyl alcohol; and the resulting solution was filtered and made acidic with gaseous hydrogen chloride. The solution was cooled and treated with a small quantity of ether whereupon there separated a crystalline material which was collected, washed with ether and dried. There was thus obtained 26.5 g. of ethyl 1-(2-carbamylethyl)-4-phenylpiperidine-4-carboxylate in the form of its hydrochloride, M.P. 179.8–182.7° C. (corr.).

*Analysis.*—Calcd. for $C_{17}H_{24}N_2O_3 \cdot HCl$: $Cl^-$, 10.40; N, 8.22. Found: $Cl^-$, 10.49; N, 8.29.

Following the above procedure using hydrobromic acid, sulfamic acid, citric acid or methanesulfonic acid in place of hydrogen chloride, there is obtained, respectively, ethyl 1-(2-carbamylethyl)-4-phenylpiperidine-4-carboxylate hydrobromide, ethyl 1 - (2 - carbamylethyl)-4-phenylpiperidine-4-carboxylate sulfamate, ethyl 1-(2-carbamylethyl)-4-phenylpiperidine-4-carboxylate citrate or ethyl 1-(2-carbamylethyl)-4-phenylpiperidine - 4 - carboxylate methanesulfonate.

The reaction of ethyl 4-phenylpiperidine-4-carboxylate with acrylamide was also carried out using tertiary-butanol as a reaction solvent, as follows: Ethyl 4-phenyl-piperidine-4-carboxylate (from 26.9 g. of its hydrochloride) dissolved in 200 cc. of ether was added to 7.0 g. of acrylamide dissolved in 200 cc. of tertiary-butanol. The solution was heated on a steam bath first to remove the ether and then heating on a steam bath was continued for an additional three hours. Decolorizing charcoal was added to the hot reaction solution, the resulting mixture filtered and the filtrate cooled. The precipitate which separated was collected and recrystallized several times from isopropyl alcohol to yield 20 g. of ethyl 1 - (2 - carbamylethyl) - 4 - phenylpiperidine - 4-carboxylate, M.P. 159.4–160.8° C. (corr.).

*Analysis.*—Calcd. for $C_{17}H_{24}N_2O_3$: N, 9.20; C, 67.09; H, 7.95. Found: N, 9.19; C, 67.43; H, 7.90.

Pharmacological evaluation of ethyl 1-(2-carbamylethyl)-4-phenylpiperidine-4-carboxylate hydrochloride in aqueous solution administered intraperitoneally to anesthetized cats subjected to mechanical stimulation according to known procedures to induce coughing has shown that this compound is approximately as effective an antitussive agent as codeine. This compound was found to have an acute toxicity ($LD_{50}$) in mice of 90±6.0 mg. per kg. when administered intravenously in aqueous solution.

EXAMPLE 2

*1-[2-(N,N-Dimethylcarbamyl)Ethyl]-4-Phenylpiperidine-4-Carboxylate*

This preparation was carried out following the procedure described in Example 1 using ethyl 4-phenyl-piperidine-4-carboxylate (from 26.9 g. of the corresponding hydrochloride), N,N-dimethylacrylamide and a heating period of three hours on a steam bath. There was thus obtained 1 - [2 - (N,N-dimethylcarbamyl)ethyl]-4-phenylpiperidine-4-carboxylate in the form of its hydrochloride, M.P. 181.8–183.4° C. (corr.).

*Analysis.*—Calcd. for $C_{19}H_{28}N_2O_3 \cdot HCl$: $Cl^-$, 9.61; N, 7.60. Found: $Cl^-$, 9.62; N, 7.53.

Pharmacological evaluation of 1-[2-(N,N-dimethylcarbamyl)ethyl] - 4 - phenylpiperidine - 4 - carboxylate hydrochloride for antitussive activity by the method described above in Example 1 has shown that this compound is approximately four times as effective an antitussive agent as codeine. In addition, pharmacological evaluation of this compound in aqueous solution administer subcutaneously by the Rat Thermal Stimulus Method of Bass and Vander Brook has shown that this compound is approximately seven times as active an analgesic as meperidine hydrochloride. This compound was found to have an acute toxicity ($LD_{50}$) in mice of 14.0±1.2 mg. per kg. when administered intravenously in aqueous solution.

EXAMPLE 3

*Ethyl 1-[2-(Ethylcarbamyl)Ethyl]-4-Phenylpiperidine-4-Carboxylate*

This compound was prepared following the procedure described in Example 1 using ethyl 4-phenylpiperidine-4-carboxylate (from 26.9 g. of its hydrochloride salt) and 10.0 g. of N-ethylacrylamide. There was thus obtained ethyl 1 - [2 - (N - ethylcarbamyl)ethyl] - 4 - phenylpiperidine-4-carboxylate in the form of its hydrochloride, M.P. 188.4–190.0° C. (corr.).

*Analysis.*—Calcd. for $C_{19}H_{28}N_2O_3 \cdot HCl$: Cl⁻, 9.61; N, 7.60. Found: Cl⁻, 9.60; N, 7.47.

Pharmacological evaluation of ethyl 1-[2-(N-ethylcarbamyl)ethyl] - 4 - phenylpiperidine - 4 - carboxylate hydrochloride for antitussive activity when determined as described in Example 1 has shown that this compound is approximately as effective an antitussive agent as codeine.

EXAMPLE 4

*Ethyl 1-[2-(N-Phenylcarbamyl)Ethyl]-4-Phenylpiperidine-4-Carboxylate*

Following the procedure described in Example 1 using ethyl 4-phenylipiperidine-4-carboxylate (from 15 g. of its hydrochloride) and 8.2 g. of N-phenylacrylamide, there was obtained 20 g. of ethyl 1-[2-(N-phenylcarbamyl)ethyl]-4-phenylpiperidine-4-carboxylate in the form of its hydrochloride, M.P. 204.6–208.4° C. (corr.) when recrystallized from isopropyl alcohol.

*Analysis.*—Calcd. for $C_{23}H_{28}N_2O_3 \cdot HCl$: Cl⁻, 8.51; N, 6.72. Found: Cl⁻, 8.40; N, 6.40.

Pharmacological evaluation of ethyl 1-[2-(N-phenylcarbamyl)ethyl] - 4 - phenylpiperidine - 4 - carboxylate hydrochloride by the method described in Example 1 has shown that this compound is approximately as effective an antitussive agent as codeine. Ethyl 1-[2-(N-phenylcarbamyl)ethyl] - 4 - phenylpiperidine - 4 - carboxylate hydrochloride when tested in aqueous solution administered intraperitoneally by the Rat Thermal Stimulus method of Bass and Vander Brook was found to be approximately as active an analgesic as meperidine hydrochloride.

EXAMPLE 5

*Ethyl 1-[2-(N,N-Diethylcarbamyl)Ethyl]-4-Phenylpiperidine-4-Carboxylate*

Following the procedure described in Example 1 using ethyl 4-phenylpiperidine-4-carboxylate (from 26.9 g. of the hydrochloride) and 14.3 g. of N,N-diethylacrylamide, there was obtained 36.2 g. of ethyl 1-[2-(N,N-diethylcarbamyl)ethyl]-4-phenylpiperidine-4-carboxylate in the form of its hydrochloride, M.P. 171.0–173.6° C. (corr.).

*Analysis.*—Calcd. for $C_{21}H_{32}N_2O_3 \cdot HCl$: Cl⁻, 8.93; N, 7.06. Found: Cl⁻, 8.92; N, 6.98.

Ethyl 1 - [2 - (N,N - diethylcarbamyl)ethyl] - 4 - phenylpiperidine-4-carboxylate hydrochloride when tested according to the procedure described in Example 1 was found to be approximately four times as effective an antitussive agent as codeine. Also, pharmacological evaluation of ethyl 1-[2-(N,N-diethylcarbamyl)ethyl]-4-phenylpiperidine-4-carboxylate hydrochloride in aqueous solution administered subcutaneously by the Rat Thermal Stimulus Method of Bass and Vander Brook has shown that this compound is approximately three times as active an analgesic as meperidine hydrochloride. This compound was found to have an acute toxicity (LD$_{50}$) in mice of 10.2±1.1 mg. per kg. when administered intravenously in aqueous solution.

EXAMPLE 6

*Ethyl 1-(2-Carbamylpropyl)-4-Phenylpiperidine-4-Carboxylate*

This compound was prepared following the procedure described in Example 1 using ethyl 4-phenylpiperidine-4-carboxylate (from 26.9 g. of the hydrochloride) and 8.5 g. of alpha-methylacrylamide. There was thus obtained 16.5 g. of ethyl 1-(2-carbamylpropyl)-4-phenylpiperidine-4-carboxylate in the form of its hydrochloride, M.P. 201.4–202.6° C. (corr.).

*Analysis.*—Calcd. for $C_{18}H_{26}N_2O_3 \cdot HCl$: Cl⁻, 9.99; N, 7.90. Found: Cl⁻, 9.96; N, 7.73.

When tested as described in Example 1, ethyl 1-(2-carbamylpropyl)-4-phenylpiperidine-4-carboxylate hydrochloride was found to be approximately one-half as effective an antitussive agent as codeine.

EXAMPLE 7

*Ethyl 1-[2-(N-Methylcarbamyl)Ethyl]-4-Phenylpiperidine-4-Carboxylate*

This compound was prepared following the procedure described in Example 1 using ethyl 4-phenylpiperidine-4-carboxylate (from 25.1 g. of the hydrochloride) and 8 g. of N-methylacrylamide. There was thus obtained 15 g. of ethyl 1-[2-(N-methylcarbamyl)ethyl]-4-phenylpiperidine-4-carboxylate in the form of its hydrochloride, M.P. 153.2–160.0° C. (corr.) when recrystallized from isopropyl alcohol.

*Analysis.*—Calcd. for $C_{18}H_{26}N_2O_3 \cdot HCl$: Cl⁻, 9.98; N, 7.89. Found: Cl⁻, 10.01; N, 7.71.

Pharmacological evaluation of ethyl 1-[2-(N-methylcarbamyl)ethyl]-4-phenylpiperidine-4-carboxylate hydrochloride for antitussive activity by the method described in Example 1 has shown that this compound is approximately one to two times as effective an antitussive agent as codeine. This compound was found to have an acute toxicity (LD$_{50}$) in mice of 55±5 mg. per kg. when administered intravenously in aqueous solution.

EXAMPLE 8

*Ethyl 1-[2-(N,N-Diisopropylcarbamyl)Ethyl]-4-Phenylpiperidine-4-Carboxylate*

Following the procedure described in Example 1 using 23.5 g. of ethyl 4-phenylpiperidine-4-carboxylate (from 27 g. of the hydrochloride) and 15.6 g. of N,N-diisopropylacrylamide, there was obtained ethyl 1-[2-(N,N-diisopropylcarbamyl)ethyl] - 4 - phenylpiperidine - 4-carboxylate in the form of its hydrochloride, M.P. 136.8–140.6° C. (corr.).

*Analysis.*—Calcd. for $C_{23}H_{36}N_2O_3 \cdot HCl$: Cl⁻, 8.34; N, 6.59. Found: Cl⁻, 8.24; N, 6.54.

When tested as described in Example 1, ethyl 1-[2-(N,N - diisopropylcarbamyl)ethyl]-4-phenylpiperidine-4-carboxylate hydrochloride was found to be approximately as effective an antitussive agent as codeine.

The intermediate N,N-diisopropylacrylamide was prepared as follows: To a solution containing 30 g. of diisopropylamine in 150 cc. of dry benzene, there was added dropwise with stirring at room temperature 27 g. of acrylyl chloride in 75 cc. of benzene. The addition took about thirty minutes and stirring was continued for another ninety minutes maintaining the temperature at about 35–40° C. To the reaction mixture was added 100 cc. of 10% aqueous sodium hydroxide solution and the resulting mixture shakened well. The ether layer was separated, dried over anhydrous sodium sulfate and distilled in vacuo to remove the solvent. The residue was distilled in vacuo to yield 24 g. of N,N-diisopropylacrylamide, B.P. 107° C. at 15 mm.; $n_D^{24}$, 1.4613.

EXAMPLE 9

*Methyl 1-(2-Carbamylethyl)-4-Phenylpiperidine-4-Carboxylate*

A 12.9 g. portion of methyl 1-benzyl-4-phenylpiperidine-4-carboxylate dissolved in 200 cc. of absolute ethanol was catalytically reduced using 1 g. of 10% palladium on charcoal as the catalyst. The reduction was carried out using about 50 lbs. pressure of hydrogen at about 50° C.

After the theoretical quantity of hydrogen had been taken up, the reaction mixture was filtered and the filtrate was distilled in vacuo to remove the solvent, thereby yielding methyl 4-phenylpiperidine-4-carboxylate which was then taken up in ether and treated with 3.5 g. of acrylamide. The resulting solution was heated on a steam bath first to remove the ether and then heating was continued for an additional hour whereupon the reaction mixture solidified. The solid material was taken up in hot isopropyl alcohol containing a little methanol; and the hot solution was filtered and cooled to yield 10.5 g. of methyl 1-(2-carbamylethyl)-4-phenylpiperidine-4-carboxylate in the form of its hydrochloride, M.P. 210.2–210.6° C. (corr.) with decomposition.

*Analysis.*—Calcd. for $C_{16}H_{22}N_2O_3 \cdot HCl$: Cl−, 10.95; N, 8.57. Found: Cl−, 10.77; N, 8.93.

EXAMPLE 10

*Isopropyl 1-(2-Carbamylethyl)-4-Phenylpiperidine-4-Carboxylate*

The intermediate isopropyl 4-phenylpiperidine-4-carboxylate was first prepared as follows: A solution containing 9.8 g. of 1-benzyl-4-phenylpiperidine-4-carboxylic acid in 300 cc. of warm pyridine was cooled in an ice bath and was treated with 11.8 g. of benzenesulfonyl chloride. To this cold solution was added 6 g. of isopropyl alcohol and the resulting solution was kept cold in an ice bath for one hour after addition of the alcohol. Two liters of ice water was added to the reaction mixture and the product that separated was collected, washed with water and recrystallized from ethanol. The solid was then treated with n-pentane, the resulting mixture filtered, and the filtrate evaporated in vacuo to yield 8.2 g. of isopropyl 1-benzyl-4-phenylpiperidine-4-carboxylate, M.P. 74–76° C.

A mixture containing 16.5 g. of isopropyl 1-benzyl-4-phenylpiperidine-4-carboxylate dissolved in 200 cc. of absolute ethanol and 1 g. of 10% palladium on charcoal was treated with 50 lbs. pressure of hydrogen for about twenty hours at a temperature of about 50° C. The reaction mixture was filtered to remove the catalyst and the filtrate was made acidic with a solution of hydrogen chloride in isopropyl alcohol. The solvent was then removed by distilling in vacuo and the residual gummy material was taken up in ethyl acetate. The ethyl acetate solution was distilled in vacuo to remove the solvent and the residue was covered with ether. To this was added 20 cc. of 10% aqueous sodium hydroxide solution and the mixture was shakened thoroughly. The ether layer containing isopropyl 4-phenylpiperidine-4-carboxylate was then separated and treated with 3.5 g. of acrylamide. The resulting reaction mixture was heated to remove the ether and heating was then continued on a steam bath for about three hours. The reaction mixture was taken up in isopropyl alcohol and the resulting solution was treated with a solution of hydrogen chloride in isopropyl alcohol. The resulting precipitate was collected and recrystallized from isopropyl alcohol to give 7.6 g. of isopropyl 1-(2-carbamylethyl)-4-phenylpiperidine-4-carboxylate in the form of its hydrochloride, M.P. 196.0–197.6° C. (corr.).

*Analysis.*—Calcd. for $C_{18}H_{26}N_2O_3 \cdot HCl$: Cl−, 9.99; N, 7.90. Found: Cl−, 9.98; N, 7.84.

Pharmacological evaluation of isopropyl 1-(2-carbamylethyl)-4-phenylpiperidine-4-carboxylate hydrochloride by the method described in Example 1 has shown that this compound is approximately as effective an antitussive agent as codeine. This compound was found to have an acute toxicity ($LD_{50}$) in rats of 51±5 mg. per kg. when administered intravenously in aqueous solution.

EXAMPLE 11

*Ethyl 1-(3-Carbamylpropyl)-4-Phenylpiperidine-4-Carboxylate*

To a solution containing ethyl 4-phenylpiperidine-4-carboxylate (from 26.9 g. of its hydrochloride) in 200 cc. of absolute ethanol was added 10 cc. of pyridine and 10.3 g. of 3-cyanopropyl chloride (gamma-chlorobutyronitrile). The resulting solution was refluxed on a steam bath for twelve hours; the solvent was removed by distilling in vacuo; and the residue was taken up in an isopropyl alcohol solution containing hydrogen chloride. The acidic isopropyl alcohol solution was treated with ether whereupon a solid separated. There was thus obtained 10.1 g. of ethyl 1-(3-cyanopropyl)-4-phenylpiperidine-4-carboxylate in the form of its hydrochloride, M.P. 183–186° C.

*Analysis.*—Calcd. for $C_{18}H_{24}N_2O_2 \cdot HCl$: Cl−, 10.52. Found: Cl−, 10.66.

The 10.1 g. portion of ethyl 1-(3-cyanopropyl)-4-phenylpiperidine-4-carboxylate hydrochloride was treated with dilute aqueous sodium hydroxide solution and extracted with ether. The ether was removed by distilling in vacuo; benzene was added and also distilled off in vacuo. The residue, ethyl 1-(3-cyanopropyl)-4-phenylpiperidine-4-carboxylate in free base form, was dissolved in 50 cc. of concentrated sulfuric acid and allowed to stand for a day. The reaction mixture was then added to ice and water, and the resulting mixture was made alkaline with aqueous sodium hydroxide solution. The mixture was extracted with ether and the ether extract was distilled in vacuo to remove the ether. The residue was dissolved in hot isopropyl alcohol and treated with a solution of hydrogen chloride in isopropyl alcohol. The resulting solution was allowed to cool and ether was added whereupon there separated 6.5 g. of ethyl 1-(3-carbamylpropyl)-4-phenylpiperidine-4-carboxylate in the form of its hydrochloride, M.P. 186.2–188.4° C. (corr.).

*Analysis.*—Calcd. for $C_{18}H_{26}N_2O_3 \cdot HCl$: Cl−, 9.99; N, 7.90. Found: Cl−, 9.86; N, 7.82.

Pharmacological evaluation of ethyl 1-(3-carbamylpropyl)-4-phenylpiperidine-4-carboxylate hydrochloride by the method described in Example 1 has shown that this compound is approximately one to two times as effective an antitussive agent as codeine. This compound was found to have an acute toxicity ($LD_{50}$) in rats of 75±5 mg. per kg. when administered intravenously in aqueous solution.

EXAMPLE 12

*n-Butyl 1-(2-Carbamylethyl)-4-Phenylpiperidine-4-Carboxylate*

The intermediate n-butyl 1-benzyl-4-phenylpiperidine-4-carboxylate was prepared as follows: To a chilled solution containing 29.5 g. of 1-benzyl-4-phenylpiperidine-4-carboxylic acid in 900 cc. of pyridine was added with stirring and cooling in an ice bath 35.3 g. of benzenesulfonyl chloride, stirring was continued for another twenty minutes and then 22.2 g. of n-butanol was added. The cold reaction mixture was stirred for an additional ninety minutes and was then poured into about 6 liters of ice water. The aqueous mixture was extracted with n-pentane; the pentane extract was dried over anhydrous sodium sulfate and distilled in vacuo to yield 20 g. of n-butyl 1-benzyl-4-phenylpiperidine-4-carboxylate, M.P. 71–74° C.

A mixture containing 17.5 g. of n-butyl 1-benzyl-4-phenylpiperidine-4-carboxylate, 200 cc. of absolute ethanol and 2 g. of palladium on charcoal was heated to 50° C. and treated with hydrogen under pressure until the uptake of hydrogen ceased. The reaction mixture was filtered and the filtrate treated with hydrogen chloride. The resulting gummy precipitate was covered with ether and the mixture was thoroughly shakened with aqueous sodium hydroxide solution. The ether layer was separated and dried over anhydrous sodium sulfate. This solution, which contained n-butyl 4-phenylpiperidine-4-carboxylate, was treated with 4.2 g. of acrylamide. The ether was removed by distilling in vacuo and the remaining material was heated for about three hours on a steam bath. The reaction mixture was dissolved in hot isopropyl alcohol;

a solution of hydrogen chloride in isopropyl alcohol was added; and the precipitate that separated was collected and recrystallized from isopropyl alcohol to yield 8 g. of n-butyl 1-(2-carbamylethyl)-4-phenylpiperidine-4-carboxylate in the form of its hydrochloride, M.P. 193.2–194.8° C. (corr.).

*Analysis.*—Calcd. for $C_{19}H_{28}N_2O_3 \cdot HCl$: Cl⁻, 9.61; C, 61.86; H, 7.64. Found: Cl⁻, 9.47; C, 61.88; H, 7.89.

EXAMPLE 13

*Ethyl 1-[2-(N-Methyl-N-Phenylcarbamyl)Ethyl]-4-Phenylpiperidine-4-Carboxylate*

The intermediate N-methyl-N-phenylacrylamide was prepared as follows: A solution containing 35 g. of N-methylaniline in 100 cc. of benzene was added dropwise to a stirred solution containing 29.6 g. of acrylyl chloride in 200 cc. of benzene kept at 0–5° C. during the addition. The temperature of the reaction mixture was allowed to rise to room temperature and the solid that had separated was filtered off. The filtrate was washed successively with water, cold dilute aqueous hydrochloric acid, cold dilute aqueous sodium hydroxide solution and water. The benzene solution was then distilled in vacuo to remove the solvent. The remaining crystalline product was washed with n-pentane to yield 24 g. of N-methyl-N-phenylacrylamide, M.P. 73–77° C.

A solution containing 5.95 g. of N-methyl-N-phenylacrylamide in 50 cc. of ether was mixed with an ether solution of ethyl 4-phenylpiperidine-4-carboxylate (from 10 g. of the hydrochloride) and the resulting mixture was heated first to remove the ether and then heated on a steam bath for about ten hours. The reaction mixture was then taken up in ether and to the ether solution was added a small quantity of n-pentane whereupon there separated 9.9 g. of ethyl 1-[2-(N-methyl-N-phenylcarbamyl)ethyl]-4-phenylpiperidine-4-carboxylate, M.P. 86–88° C.

Five grams of ethyl 1-[2-(N-methyl-N-phenylcarbamyl)-ethyl]-4-phenylpiperidine-4-carboxylate was dissolved in isopropyl alcohol and the resulting solution treated with an equivalent quantity of hydrogen chloride in isopropyl alcohol. When no crystallization resulted even after addition of ether, the solvent was removed in vacuo by distillation and the remaining material treated with dry ether and allowed to stand for about two weeks. The material then had crystallized and was taken up in boiling ethyl acetate containing a trace of methanol. The solution was cooled and the resulting precipitate collected to yield 3.7 g. of ethyl 1-[2-(N-methyl-N-phenylcarbamyl)ethyl]-4-phenylpiperidine-4-carboxylate in the form of its hydrochloride, M.P. 164.0–164.8° C. (corr.).

*Analysis.*—Calcd. for $C_{24}H_{30}N_2O_3 \cdot HCl$: Cl⁻, 8.24; N, 6.50. Found: Cl⁻, 8.09; N, 6.42.

Ethyl 1-[2-(N-methyl - N - phenylcarbamyl)ethyl] - 4-phenylpiperidine-4-carboxylate hydrochloride when tested for antitussive activity as described in Example 1 was found to be approximately twice as effective an antitussive agent as codeine. In addition, this compound was found to be approximately seven times as active an analgesic as meperidine hydrochloride when tested in aqueous solution administered subcutaneously by the Rat Thermal Stimulus Method of Bass and Vander Brook.

Other representative lower-alkyl 1-[carbamyl-(polycarbon-lower-alkyl)]-4-phenylpiperidine-4-carboxylates that can be prepared according to the foregoing procedures using molar equivalent quantities of the corresponding lower-alkyl 4-phenylpiperidine-4-carboxylate and appropriate carbamyl-(polycarbon-lower-alkylating) agent are the following compounds of Examples 14–37. These compounds can be isolated in their free base form or in the form of their acid-addition salts, preferably their hydrochlorides, as illustrated.

EXAMPLE 14 n-Hexyl 1-(2-carbamylethyl)-4-phenylpiperidine-4-carboxylate hydrochloride is obtained following the procedure described in Example 1 using n-hexyl 4-phenylpiperidine-4-carboxylate and acrylamide.

EXAMPLE 15

Ethyl 1-[2-(N-n-butylcarbamyl)ethyl]-4-phenylpiperidine-4-carboxylate hydrochloride is obtained following the procedure described in Example 1 using ethyl 4-phenylpiperidine-4-carboxylate and N-n-butylacrylamide.

EXAMPLE 16

Ethyl 1-[2-(N-n-amylcarbamyl)ethyl]-4-phenylpiperidine-4-carboxylate hydrochloride is obtained following the procedure described in Example 1 using ethyl 4-phenylpiperidine-4-carboxylate and N-n-amylacrylamide.

EXAMPLE 17

Ethyl 1-[2-(N-ethyl-N-methylcarbamyl)ethyl]-4-phenylpiperidine-4-carboxylate hydrochloride is obtained following the procedure described in Example 1 using ethyl 4-phenylpiperidine-4-carboxylate and N-ethyl-N-methylacrylamide.

EXAMPLE 18

Ethyl 1-[2-(N-2 - naphthylcarbamyl)ethyl]-4 - phenylpiperidine-4-carboxylate hydrochloride is obtained following the procedure described in Example 1 using ethyl 4-phenylpiperidine-4-carboxylate and N-(2-naphthyl)-acrylamide.

EXAMPLE 19

Ethyl 1-[2-(N-2 - biphenylcarbamyl)ethyl]-4 - phenylpiperidine-4-carboxylate hydrochloride is obtained following the procedure described in Example 1 using ethyl 4-phenylpiperidine-4-carboxylate and N-(2-biphenylyl)-acrylamide.

EXAMPLE 20

Ethyl 1-[2-(N-2 - furyl - N - methylcarbamyl)ethyl]-4-phenylpiperidine-4-carboxylate hydrochloride is obtained following the procedure described in Example 1 using ethyl 4-phenylpiperidine-4-carboxylate and N-(2-furyl)-N-methylacrylamide.

EXAMPLE 21

Ethyl 1-[2 - (N - 3 - pyridylcarbamyl)ethyl]-4 - phenylpiperidine-4-carboxylate hydrochloride is obtained following the procedure described in Example 1 using ethyl 4-phenylpiperidine-4-carboxylate and N-(3-pyridyl)acrylamide.

EXAMPLE 22

Ethyl 1-[2-(N-2-thienyl-N-n-propylcarbamyl)ethyl]-4-phenylpiperidine-4-carboxylate hydrochloride is obtained following the procedure described in Example 1 using ethyl 4-phenylpiperidine-4-carboxylate and N-(2-thienyl)-N-n-propylacrylamide.

EXAMPLE 23

Ethyl 1-[2-(N-methyl-N-2 - pyrimidylcarbamyl)ethyl]-4-phenylpiperidine-4-carboxylate hydrochloride is obtained following the procedure described in Example 1 using ethyl 4-phenylpiperidine-4-carboxylate and N-methyl-N-(2-pyrimidyl)acrylamide.

EXAMPLE 24

Ethyl 1-[2-(N,N - diphenylcarbamyl)ethyl]-4 - phenylpiperidine-4-carboxylate hydrochloride is obtained following the procedure described in Example 1 using ethyl 4-phenylpiperidine-4-carboxylate and N,N-diphenylacrylamide.

EXAMPLE 25

Ethyl 1-[2-(N - 4 - chlorophenyl-N - phenylcarbamyl)-ethyl]-4-phenylpiperidine-4-carboxylate hydrochloride is obtained following the procedure described in Example 1 using ethyl 4-phenylpiperidine-4-carboxylate and N-(4-chlorophenyl)-N-phenylacrylamide.

EXAMPLE 26

Ethyl 1-[2-(N-4-methoxyphenylcarbamyl)ethyl]-4-phenylpiperidine-4-carboxylate hydrochloride is obtained following the procedure described in Example 1 using ethyl 4-phenylpiperidine-4-carboxylate and N-(4-methoxyphenyl)acrylamide.

EXAMPLE 27

Ethyl 1-[2-(N-4-bromophenylcarbamyl)ethyl]-4-phenylpiperidine-4-carboxylate hydrochloride is obtained following the procedure described in Example 1 using ethyl 4-phenylpiperidine-4-carboxylate and N-(4-bromophenyl)acrylamide.

EXAMPLE 28

Ethyl 1-[2-(N-3-ethoxyphenyl-N-methylcarbamyl)ethyl]-4-phenylpiperidine-4-carboxylate hydrochloride is obtained following the procedure described in Example 1 using ethyl 4-phenylpiperidine-4-carboxylate and N-(3-ethoxyphenyl)-N-methylacrylamide.

EXAMPLE 29

Ethyl 1-[2-(N-2-methylphenylcarbamyl)ethyl]-4-phenylpiperidine-4-carboxylate hydrochloride is obtained following the procedure described in Example 1 using ethyl 4-phenylpiperidine-4-carboxylate and N-(2-methylphenyl)acrylamide.

EXAMPLE 30

Ethyl 1-[2-(N-2-chloro-4-ethoxyphenylcarbamyl)ethyl]-4-phenylpiperidine-4-carboxylate hydrochloride is obtained following the procedure described in Example 1 using ethyl 4-phenylpiperidine-4-carboxylate and N-(2-chloro-4-ethoxyphenyl)acrylamide.

EXAMPLE 31

Ethyl 1-[2-(N-3,4,5-trimethoxyphenylcarbamyl)ethyl]-4-phenylpiperidine-4-carboxylate hydrochloride is obtained following the procedure described in Example 1 using ethyl 4-phenylpiperidine-4-carboxylate and N-(3,4,5-trimethoxyphenyl)acrylamide.

EXAMPLE 32

Ethyl 1-[2-(N-4-n-butylaminophenylcarbamyl)ethyl]-4-phenylpiperidine-4-carboxylate hydrochloride is obtained following the procedure described in Example 1 using ethyl 4-phenylpiperidine-4-carboxylate and N-(4-n-butylaminophenyl)acrylamide.

EXAMPLE 33

Ethyl 1-[2-(N-4-acetylaminophenylcarbamyl)ethyl]-4-phenylpiperidine-4-carboxylate hydrochloride is obtained following the procedure described in Example 1 using ethyl 4-phenylpiperidine-4-carboxylate and N-(4-acetylaminophenyl)acrylamide.

EXAMPLE 34

Ethyl 1-[2-(N-4-ethylmercaptophenylcarbamyl)ethyl]-4-phenylpiperidine-4-carboxylate hydrochloride is obtained following the procedure described in Example 1 using ethyl 4-phenylpiperidine-4-carboxylate and N-(4-ethylmercaptophenyl)acrylamide.

EXAMPLE 35

Ethyl 1-[2-(N-4-ethylsulfonylphenylcarbamyl)ethyl]-4-phenylpiperidine-4-carboxylate hydrochloride is obtained following the procedure described in Example 1 using ethyl 4-phenylpiperidine-4-carboxylate and N-(4-ethylsulfonylphenyl)acrylamide.

EXAMPLE 36

Ethyl 1-[2-(N-4-aminophenyl-N-methylcarbamyl)ethyl]-4-phenylpiperidine-4-carboxylate hydrochloride is obtained following the procedure described in Example 1 using ethyl 4-phenylpiperidine-4-carboxylate and N-(4-aminophenyl)-N-methylacrylamide.

EXAMPLE 37

Ethyl 1-[2-(N-2-thiazolylcarbamyl)ethyl]-4-phenylpiperidine-4-carboxylate hydrochloride is obtained following the procedure described in Example 1 using ethyl 4-phenylpiperidine-4-carboxylate and N-(2-thiazolyl)acrylamide.

EXAMPLE 38

Ethyl 1-(4-carbamylbutyl)-4-phenylpiperidine-4-carboxylate hydrochloride is obtained following the procedure described in Example 11 first using ethyl 4-phenylpiperidine-4-carboxylate and 4-cyanobutyl chloride and then hydrolyzing the resulting ethyl 1-(4-cyanobutyl)-4-phenylpiperidine-4-carboxylate, and converting the resulting 1-(4-carbamylbutyl) free base into its hydrochloride salt.

The intermediate ethyl 1-(4-cyanobutyl)-4-phenylpiperidine-4-carboxylate was prepared following the procedure described in Example 11 for the preparation of the corresponding 1-(3-cyanopropyl) compound using ethyl 4-phenylpiperidine-4-carboxylate (from 54 g. of its hydrochloride) and 29.2 g. of 4-cyanobutyl chloride (delta-chorovaleronitrile). There was thus obtained 18 g. of ethyl 1-(4-cyanobutyl)-4-phenylpiperidine-4-carboxylate and its hydrochloride, melting point indefinite (softening at 107.2° C.) when recrystallized from isopropyl alcohol.

*Analysis.*—Calcd. for $C_{19}H_{26}N_2O_2 \cdot HCl$: Cl−, 10.10; N, 7.98. Found: Cl−, 9.95; N, 7.92.

The above hydrochloride salt is converted into its free base in the usual manner as in Example 11 and used in the above-described preparation.

EXAMPLE 39

Ethyl 1-[6-(N-methylcarbamyl)hexyl]-4-phenylpiperidine-4-carboxylate hydrochloride is obtained by reacting ethyl 4-phenyl-piperidine-4-carboxylate with 6-(N-methylcarbamyl)hexyl chloride. This preparation can be carried out following the procedure described in Example 11 for the preparation of the corresponding 1-(3-cyanopropyl) compound by reaction of ethyl 4-phenylpiperldine-4-carboxylate with 3-cyanopropyl chloride. When the reaction is run in the absence of pyridine, the hydrochloride salt is obtained directly from the reaction.

Similarly, following the above procedure, using no pyridine and substituting 4-carbamylbutyl bromide or 3-(N-methyl-N-phenylcarbamyl)propyl iodide for 6-(N-methylcarbamyl)hexyl chloride, there is obtained ethyl 1-(4-carbamylbutyl)-4-phenylpiperidine-4-carboxylate hydrobromide or 1-[3-(N-methyl-N-phenyl)-propyl]-4-phenylpiperidine-4-carboxylate hydriodide, respectively.

EXAMPLE 40

Ethyl 1-(2-carbamylethyl)-4-phenylpiperidine-4-carboxylate hydrochloride is obtained following, in part, the procedure described in Example 11 first using ethyl 4-phenylpiperidine-4-carboxylate and acrylonitrile and then hydrolyzing the resulting ethyl 1-(2-cyanoethyl)-4-phenylpiperidine-4-carboxylate, and converting the resulting free base into its hydrochloride salt.

The intermediate ethyl 1-(2-cyanoethyl)-4-phenylpiperidine-4-carboxylate was prepared as follows: An ether solution containing ethyl 4-phenylpiperidine-4-carboxylate (from 26.9 g. of its hydrochloride) and 5.3 g. of acrylonitrile was heated under reflux for four and one-half hours on a steam bath. The ether was removed by distilling in vacuo to yield 26 g. of ethyl 1-(2-cyanoethyl)-4-phenylpiperidine-4-carboxylate as an oil. A 5 g. sample of the oil was dissolved in 30 cc. of isopropyl alcohol and a solution of hydrogen chloride in isopropyl alcohol was added. The precipitate was collected, washed with a mixture containing isopropyl alcohol and ether and dried. There was thus obtained 4.7 g. of ethyl 1-(2-cyanoethyl)-4-phenylpiperidine-4-carboxylate hydrochloride, M.P. 200–202.5° C. (corr.).

*Analysis.*—Calcd. for $C_{17}H_{22}N_2O_2 \cdot HCl$: Cl⁻, 10.99; N, 8.68. Found: Cl⁻, 10.93; N, 8.76.

The above hydrochloride salt is converted into its free base in the usual manner as in Example 11 and used in the above-described preparation.

EXAMPLE 41

*Ethyl 1-[2-(N-4-Methoxyphenylcarbamyl)Ethyl]-4-Phenylpiperidine-4-Carboxylate*

A solution containing 17.7 g. of N-(4-methoxyphenyl) acrylamide in toluene was added to a toluene solution of ethyl 4-phenylpiperidine-4-carboxylate (from 27 g. of the hydrochloride) and the resulting mixture was refluxed for about six hours. The reaction mixture was cooled, yielding a white crystalline solid which was collected. The solid was dissolved in isopropyl alcohol and the resulting solution was treated with 1.96 g. of ethanesulfonic acid. The resulting precipitate was collected, washed first with isopropyl alcohol and then with ether, and dried to yield 7.7 g. of ethyl 1-[2-(N-4-methoxyphenylcarbamyl)ethyl]-4-phenylpiperidine-4-carboxylate in the form of its ethanesulfonate, indefinite M.P. starting at 128.8° C. (corr.).

*Analysis.*—Calcd. for $C_{24}H_{30}N_2O_4 \cdot C_2H_5SO_3H$: $C_2H_5SO_3H$, 21.13; N, 5.38. Found: $C_2H_5SO_3H$, 20.82; N, 5.23.

EXAMPLE 42

*Ethyl 1-[2-(N-4-Chlorophenylcarbamyl)Ethyl]-4-Phenylpiperidine-4-Carboxylate*

This compound was prepared following the procedure described in Example 1 using ethyl 4-phenylpiperidine-4-carboxylate (from 13.5 g. of the hydrochloride), 9.1 g. or N-(4-chlorophenyl)acrylamide and tertiary-butanol as the reaction solvent. There was thus obtained 13.5 g. of ethyl 1-[2-(N-4-chlorophenylcarbamyl)ethyl]-4-phenylpiperidine-4-carboxylate in the form of its hydrochloride, M.P. 219.8–221.2° C. (corr.) when recrystallized from absolute ethanol.

*Analysis.*—Calcd. for $C_{23}H_{27}ClN_2O_3 \cdot HCl$: Cl, 15.71; N, 6.21. Found: Cl, 15.68; N, 6.11.

EXAMPLE 43

*Ethyl 1-[2-(N-Ethyl-N-Phenylcarbamyl)Ethyl]-4-Phenylpiperidine-4-Carboxylate*

This compound was prepared following the procedure described in Example 13 using ethyl 4-phenylpiperidine-4-carboxylate (from 18.8 g. of the hydrochloride), 12.2 g. of N-ethyl-N-phenylacrylamide and a heating period of about 7 hours on a steam bath. There was thus obtained 14.3 g. of ethyl 1-[2-(N-ethyl-N-phenylcarbamyl) ethyl]-4-phenylpiperidine-4-carboxylate in the form of its hydrochloride, M.P. 150.0–151.2° C. (corr.).

*Analysis.*—Calcd. for $C_{25}H_{32}N_2O_3 \cdot HCl$: Cl, 7.97; N, 6.30. Found: Cl, 7.80; N, 6.05.

Pharmacological evaluation of ethyl 1-[2-(N-ethyl-N-phenylcarbamyl)ethyl] - 4-phenylpiperidine-4-carboxylate hydrochloride in aqueous solution administered to rats subcutaneously using the D'Amour-Smith method has shown that this compound is about three and one half times as potent an analgesic as meperidine hydrochloride on a molar basis in terms of the bases.

EXAMPLE 44

*Ethyl 1-[2-(N-Tertiary-Butylcarbamyl)Ethyl]-4-Phenylpiperidine-4-Carboxylate*

This preparation was carried out following the procedure described in Example 41 using ethyl 4-phenylpiperidine-4-carboxylate (from 26.9 g. of the hydrochloride), 200 cc. of toluene, 12.7 g. of N-tertiary-butylacrylamide and a reflux period of about six hours. There was thus obtained 17.5 g. of ethyl 1-[2-(N-tertiary-butylcarbamyl) ethyl]-4-phenylpiperidine-4-carboxylate in the form of its hydrochloride, M.P. 159.6–161.5° C. (corr.) when recrystallized from water.

*Analysis.*—Calcd. for $C_{21}H_{32}N_2O_3 \cdot HCl$: Cl, 8.93; N, 7.06. Found: Cl, 8.78; N, 6.83.

Pharmacological evaluation of ethyl 1-[2-(N-tertiary-butylcarbamyl)ethyl] - 4 - phenylpiperidine-4-carboxylate hydrochloride in aqueous solution administered to rats subcutaneously using the D'Amour-Smith method has shown that this compound is about three times as potent an analgesic as meperidine hydrochloric on a molar basis in terms of the bases.

EXAMPLE 45

*Ethyl 1-[2-(N-4-Methoxyphenethylcarbamyl)Ethyl]-4-Phenylpiperidine-4-Carboxylate*

This compound was prepared following the procedure described in Example 1 using ethyl 4-phenylpiperidine-4-carboxylate (from 20.5 g. of the hydrochloride), 15.4 g. of N-(4-methoxyphenethyl)acrylamide and a reflux period of about 12 hours. There was thus obtained 6.6 g. of ethyl 1-[2 - (N - 4 - methoxyphenethylcarbamyl)ethyl]-4-phenylpiperidine-4-carboxylate in the form of its hydrochloride, M.P. 136.8–138.0° C. (corr.) when recrystallized from isopropyl alcohol-ether.

*Analysis.*—Calcd. for $C_{26}H_{34}N_2O_4 \cdot HCl$: Cl, 7.46; N, 5.90. Found: Cl, 7.75; N, 5.79.

EXAMPLE 46

*Ethyl 1-[2-(N-Phenethylcarbamyl)Ethyl]-4-Phenylpiperidine-4-Carboxylate*

This preparation was carried out following the procedure described in Example 13 using ethyl 4-phenylpiperidine-4-carboxylate (from 26.9 g. of the hydrochloride), 17.5 g. of N-phenethylacrylamide and a heating period of about 16 hours. There was thus obtained 29.5 g. of ethyl 1-[2-(N-phenethylcarbamyl)ethyl]-4-phenylpiperidine-4-carboxylate in the form of its hydrochloride, M.P. 177.2–178.4° C. (corr.).

*Analysis.*—Calcd. for $C_{25}H_{32}N_2O_3 \cdot HCl$: Cl, 7.97; N, 6.30. Found: Cl, 8.00; N, 6.19.

EXAMPLE 47

*Ethyl 1-[2-(N-Benzyl-N-Methylcarbamyl)Ethyl]-4-Phenylpiperidine-4-Carboxylate*

This preparation was carried out following the procedure described in Example 13 using ethyl-4-piperidine-4-carboxylate (from 26.9 g. of the hydrochloride), 17.5 g. of N-benzyl-N-methyl-acrylamide and a heating period of about 6 hours. There was thus obtained 38.4 g. of ethyl 1 - [2 - (N - benzyl - N - methylcarbamyl)ethyl] - 4-phenylpiperidine-4-carboxylate in the form of its hydrochloride, M.P. 172.4–172.8° C. (corr.) when recrystallized from isopropyl alcohol.

*Analysis.*—Calcd. for $C_{25}H_{32}N_2O_3 \cdot HCl$: Cl, 7.97; N, 6.30. Found: Cl, 8.10; N, 6.77.

EXAMPLE 48

*Ethyl 1-[2-(N-Methyl-N-3-Phenylpropylcarbamyl)Ethyl] 4-Phenylpiperidine-4-Carboxylate*

This compound was prepared following the procedure described in Example 13 using ethyl 4-phenylpiperidine-4-carboxylate (from 20.2 g. of the hydrochloride), 15.2 g. of N-methyl-N-(3-phenylpropyl)acrylamide and a heating period of about 8 hours. There was thus obtained 18.5 g. of ethyl 1-[2-N-methyl-N-3-phenylpropylcarbamyl)ethyl]-4-phenylpiperidine-4-carboxylate in the form of its hydrochloride, M.P. 104.6–106.2° C. (corr.) when recrystallized from isopropyl alcohol-ether.

*Analysis.*—Calcd. for $C_{27}H_{36}N_2O_3 \cdot HCl$: C, 68.55; H, 7.88; Cl, 7.49. Found: C, 68.25; H, 8.00; Cl, 7.75.

EXAMPLE 49

*Ethyl 1-[2-(N-n-Hexylcarbamyl)Ethyl]-4-Phenylpiperidine-4-Carboxylate*

This compound was prepared following the procedure described in Example 13 using 0.1 mole of ethyl 4-phenylpiperidine-4-carboxylate, 0.1 mole of N-n-hexylacrylamide and a heating period of about 16 hours. There was thus obtained 4.5 g. of ethyl 1-[2-(N-n-hexylcarbamyl)ethyl]-4-phenylpiperidine-4-carboxylate in the form of its hydrochloride, M.P. 106.4–109.8° C. (corr.) when recrystallized from water.

Analysis.—Calcd. for $C_{23}H_{36}N_2O_3 \cdot Cl$: Cl, 8.34; N, 6.59. Found: Cl, 8.40; N, 6.44.

EXAMPLE 50

*Ethyl 1-[2-(N-Allylcarbamyl)Ethyl]-4-Phenylpiperidine-4-Carboxylate*

This preparation was carried out following the procedure described in Example 13 using ethyl 4-phenylpiperidine-4-carboxylate (from 27.0 g. of the hydrochloride), 11.1 g. of N-allyl-acrylamide and a heating period of about 20 hours. There was thus obtained 28.5 g. of ethyl 1-[2-(n-allylcarbamyl)ethyl]-4-phenyl-piperidine-4-carboxylate in the form of its hydrochloride, M.P. 172.8–174.2° C. (corr.) when recrystallized from isopropyl alcohol to which an equal volume of ether was added after crystallization seemed fairly complete.

Analysis.—Calcd. for $C_{20}H_{28}N_2O_3 \cdot HCl$: Cl, 9.31; N, 7.35. Found: Cl, 9.20; N, 7.29.

Pharmacological evaluation of ethyl 1-[2-(N-allylcarbamyl)ethyl]-4-phenylpiperidine - 4 - carboxylate hydrochloride in aqueous solution administered to rats subcutaneously using the D'Amour-Smith method has shown that this compound is about two times as potent as analgesic as meperidine hydrochloride on a molar basis in terms of the bases.

EXAMPLE 51

*Ethyl 1-[2-(N-Cyclohexylcarbamyl)Ethyl]-4-Phenylpiperidine-4-Carboxylate*

A mixture containing ethyl 4-phenylpiperidine-4-carboxylate (from 20.1 g. of the hydrochloride) and 15.3 g. of N-cyclohexylacrylamide was heated on a steam bath for about two hours after which time the reaction mixture solidified. The solid was taken up in isopropyl alcohol and treated with hydrogen chloride in isopropyl alcohol. The isopropyl alcohol was removed in vacuo to the point of crystallization and ether was added. The resulting precipitate was collected and recrystallized from ethanol to yield 18.5 g. of ethyl 1-[2-(N-cyclohexylcarbamyl)ethyl]-4-phenylpiperidine-4-carboxylate in the form of its hydrochloride, M.P. 191.0–192.8° C. (corr.).

Analysis.—Calcd. for $C_{23}H_{34}N_2O_3 \cdot HCl$: Cl, 8.38; N, 6.62. Found: Cl, 8.54; N, 6.44.

EXAMPLE 52

*1-[3-(4-Phenyl-4-Carbethoxy-1-Piperidyl)Propanoyl]Piperidine*

A toluene solution containing ethyl 4-phenylpiperidine-4-carboxylate (from 26.95 g. of the hydrochloride) and N-acrylylpiperidine was refluxed for 6 hours. The toluene was then removed by distilling in vacuo and the remaining material treated with a molar equivalent quantity of hydrogen chloride in isopropyl alcohol. After addition of ether had yielded no precipitate, the solvent was removed in vacuo and the remaining material crystallized. The crystalline material was triturated with boiling ethyl acetate, the mixture filtered, and the crystalline material recrystallized twice by dissolving it in methanol, adding excess ethyl acetate and boiling off the methanol to incipient crystallization. There was thus obtained 27.0 g. of 1-[3-(4-phenyl-4-carbethoxy-1-piperidyl)propanoyl]piperidine in the form of its hydrochloride, M.P. 189.2–191.2° C. (corr.).

Analysis.—Calcd. for $C_{22}H_{32}N_2O_3 \cdot HCl$: Cl, 8.67; N, 6.85. Found: Cl, 8.92; N, 6.76.

Pharmacological evaluation of 1-[3-(4-phenyl-4-carbethoxy-1-piperidyl)propanoyl]piperidine hydrochloride in aqueous solution administered to rats subcutaneously using the D'Amour-Smith method has shown that this compound is about thirteen times as potent an analgesic as meperidine hydrochloride on a molar basis in terms of the bases.

EXAMPLE 53

*1-[3-(4-Phenyl-4-Carbethoxy-1-Piperidyl)Propanoyl]Pyrrolidine*

This preparation was carried out following the procedure described in Example 52 using ethyl 4-phenylpiperidine-4-carboxylate (from 26.9 g. of the hydrochloride) and 12.5 g. of N-acrylylpyrrolidine. There was thus obtained 31.2 g. of 1-[3-(4-phenyl-4-carbethoxy-1-piperidyl)propanoyl]pyrrolidine in the form of its hydrochloride, M.P. 183.8–185.4° C. (corr.) when recrystallized once from isopropyl alcohol and once from isopropyl alcohol and ether.

Analysis.—Calcd. for $C_{21}H_{30}N_2O_3 \cdot HCl$: Cl, 9.00; N, 7.11. Found: Cl, 9.22; N, 7.02.

Pharmacological evaluation of 1-[3-(4-phenyl-4-carbethoxy-1-piperidyl)propanoyl]pyrrolidine hydrochloride in aqueous solution administered to rats subcutaneously using the D'Amour-Smith method has shown that this compound is about nineteen times as potent an analgesic as meperidine hydrochloride on a molar basis in terms of the bases.

EXAMPLE 54

*2-Methyl-1-[3-(4-Phenyl - 4 - Carbethoxy - 1 - Piperidyl)Propanoyl]Piperidine*

This compound was prepared following the procedure described in Example 52 using ethyl 4-phenylpiperidine-4-carboxylate (from 26.9 g. of the hydrochloride) and 15.3 g. of N-acrylyl-2-methylpiperidine. There was thus obtained 17.5 g. of 2-methyl-1-[3-(4-phenyl-4-carbethoxy-1-piperidyl)propanoyl]3piperidine in the form of its hydrochloride, M.P. 182.6–184.4° C. (corr.) when recrystallized from ethyl acetate containing a small amount of methanol.

Analysis.—Calcd. for $C_{23}H_{34}N_2O_3 \cdot HCl$: Cl, 8.38; N, 6.62. Found: Cl, 8.25; N, 6.55.

Pharmacological evaluation of 2-methyl-1-[3-(4-phenyl-4-carbethoxy - 1 - piperidyl)propanoyl]piperidine hydrochloride in aqueous solution administered to rats subcutaneously using the D'Amour-Smith method has shown that this compound is about eleven times as potent an analgesic as meperidine hydrochloride on a molar basis in terms of the bases.

EXAMPLE 55

*N-[3-(4-Phenyl - 4 - Carbethoxy - 1 - Piperidyl)Propanoyl]Morpholine*

This preparation was carried out following the procedure described in Example 13 using ethyl 4-phenylpiperidine-4-carboxylate (from 29.4 g. of the hydrochloride), 15.4 g. of N-acrylylmorpholine and a heating period on a steam bath of about 11 hours. There was thus obtained 40.5 g. of N-[3-(4-phenyl-4-carbethoxy-1-piperidyl)propanoyl]morpholine in the form of its hydrochloride, M.P. 217.6–218.8° C. (corr.)

Analysis.—Calcd. for $C_{21}H_{30}N_2O_4 \cdot HCl$: Cl, 8.63; N, 6.82. Found: Cl, 8.75; N, 6.69.

EXAMPLE 56

*1-(2-Carbamylethyl) - 4 - Phenyl - 4 - n - Propanoylpiperidine*

1-benzyl-4-phenyl-4-n-propanoylpiperidine (17.7 g.) dissolved in ethanol (total volume of 150 cc.) warmed to 48° C. was catalytically hydrogenated in the presence of a palladium-on-charcoal catalyst. The reaction mixture was filtered to removed the catalyst and the solvent was removed by distilling in vacuo. The remaining material, 4-phenyl-4-n-propanoylpiperidine, was dissolved in ether and the ether solution treated with 4.3 g. of acrylamide.

The ether was removed by distillation and the remaining mixture heated on a steam bath for an additional three hours. The reaction mixture was dissolved in isopropyl alcohol and treated with hydrogen chloride in isopropyl alcohol. The mixture was cooled; and the precipitate was collected and recrystallized from isopropyl alcohol to yield 12.5 g. of 1-(2-carbamylethyl)-4-phenyl-4-n-propanoylpiperidine in the form of its hydrochloride, M.P. 179.4–181.0° C. (corr.).

*Analysis.*—Calcd. for $C_{17}H_{24}N_2O_2 \cdot HCl$: Cl, 10.94; N, 8.62. Found: Cl, 10.79; N, 8.60.

EXAMPLE 57

*1-[2-(N-Methyl - N - Phenylcarbamyl)Ethyl]-4-Phenyl-4-n-Propanoylpiperidine*

To an ether solution of 4-phenyl-4-propanoylpiperidine (from 7.6 g. of the hydrochloride) was added 5.0 g. of N-methyl-N-phenylacrylamide dissolved in 30 cc. of t-butanol. This reaction mixture was heated on a steam bath for about 4 hours, allowing most of the t-butanol to evaporate. The residual material was taken up in ether, the ether solution filtered, and the filtrate treated with hydrogen chloride dissolved in isopropyl alcohol. The oil that separated soon crystallized and was collected. The crystalline material was recrystallized from isopropyl alcohol to yield 8.8 g. of 1-[2-(N-methyl-N-phenylcarbamyl)ethyl]-4-phenyl-4-n-propanoylpiperidine in the form of its hydrochloride, M.P. 191.01–194.2° C. (corr.).

*Analysis.*—Calcd. for $C_{24}H_{30}N_2O_2 \cdot HCl$: Cl, 8.54; N, 6.75. Found: Cl, 8.32; N, 6.49.

Pharmacological evaluation of 1-[2-(N-methyl-N-phenylcarbamyl)ethyl]-4-phenyl - 4 -n - propanoylpiperidine hydrochloride in aqueous solution administered to rats subcutaneously using the D'Amour-Smith method has shown that this compound is about as potent an analgesic as meperidine hydrochloride on a molar basis in terms of the bases.

EXAMPLE 58

*1-[2-(N,N-Dimethylcarbamyl)Ethyl] - 4 - Phenyl-4-n-Propanoylpiperidine*

To an ether solution containing 4-phenyl-4-n-propanoylpiperidine (from 5.06 g. of the hydrochloride) was added 2 g. of N,N-dimethylacrylamide and the resulting reaction mixture was heated on a steam bath for four hours after evaporation of the ether. The reaction mixture was then taken up in ether, the ether solution filtered, and a solution of hydrogen chloride in isopropyl alcohol added to the filtrate. The gummy precipitate soon crystallized and was recrystallized from isopropyl alcohol to yield 3.3 g. of 1-[2-(N,N-dimethylcarbamyl)ethyl]-4-phenyl-4-n-propanoylpiperidine in the form of its hydrochloride, M.P. 194.0–196.0° C. (corr.).

*Analysis.*—Calcd. for $C_{19}H_{28}N_2O_2 \cdot HCl$: Cl, 10.05; N, 7.94. Found: Cl, 9.96; N, 7.83.

EXAMPLE 59

*1-[2-(N-Benzyl-N-Methylcarbamyl)Ethyl] - 4 - Phenyl-4-Piperidinol*

A mixture of 10.1 g. of 4-phenyl-4-piperidinol and 10 g. of N-benzyl-N-methylacrylamide was heated on a steam bath for about 6 hours. The reaction mixture was allowed to cool whereupon solidification resulted. The solid was collected, washed with ether and found to weigh about 21 g. (M.P. 123–125° C.). Six grams of this material, 1-[2-(N-benzyl-N-methylcarbamyl)ethyl]-4-phenyl-4-piperidinol, was taken up in acetone and the acetone solution treated with hydrogen chloride in ether. The crystalline hydrochloride that separated was collected and found to melt at 155.8–156.6° C. (corr.).

*Analysis.*—Calcd. for $C_{22}H_{28}N_2O_2 \cdot HCl$: C, 67.95; H, 7.51; N, 7.20. Found: C, 68.10; H, 7.57; N, 7.39.

Other representative compounds of my invention that can be prepared according to the foregoing procedures using molar equivalent quantities of the appropriate reactants are presented in the following examples. These compounds can be isolated in their free base form or in the form of their acid-addition salts, preferably their hydrochlorides, as illustrated.

EXAMPLE 60

Ethyl 1-[2-(N - 2 - oxazolylcarbamyl)ethyl]-4-phenylpiperidine-4-carboxylate hydrochloride is obtained following the procedure described in Example 1 using ethyl 4-phenylpiperidine-4-carboxylate and N-(2-oxazolyl)acrylamide.

EXAMPLE 61

Ethyl 4 - phenyl-1-[2-(N-2-triazinylcarbamyl)ethyl]piperidine-4-carboxylate hydrochloride is obtained following the procedure described in Example 1 using ethyl 4-phenylpiperidine-4-carboxylate and N-(2-triazinyl)acrylamide.

EXAMPLE 62

Ethyl 1-[2-(N-4-dimethylaminophenylcarbamyl)ethyl]-4-phenylpiperidine-4-carboxylate hydrochloride is obtained following the procedure described in Example 1 using ethyl 4-phenylpiperidine-4-carboxylate and N-(4-dimethylaminophenyl)acrylamide.

EXAMPLE 63

Ethyl 4-(4-biphenyl)-1-[2-(N-4-nitrophenylcarbamyl)-ethyl]piperidine-4-carboxylate hydrochloride is obtained following the procedure described in Example 1 using ethyl 4-(4-biphenylyl)piperidine-4-carboxylate and N-(4-nitrophenyl)acrylamide.

EXAMPLE 64

Ethyl 4-phenyl-1-[2-(N - 3 - trifluoromethylphenylcarbamyl)ethyl]piperidine-4-carboxylate hydrochloride is obtained following the procedure described in Example 1 using ethyl 4-phenylpiperidine-4-carboxylate and N-(3-trifluoromethylphenyl)acrylamide.

EXAMPLE 65

Ethyl 4-(2-furyl)-1-[2-(N-4-phenoxyphenylcarbamyl)-ethyl]piperidine-4-carboxylate hydrochloride is obtained following the procedure described in Example 1 using ethyl 4-(2-furyl)piperidine - 4 - carboxylate and N-(4-phenoxyphenyl)acrylamide.

EXAMPLE 66

Ethyl 1-[2-(N-4-benzyloxyphenylcarbamyl)ethyl]-4-phenylpiperidine-4-carboxylate hydrochloride is obtained following the procedure described in Example 1 using ethyl 4-phenylpiperidine-4-carboxylate and N-(4-benzyloxyphenyl)acrylamide.

EXAMPLE 67

Ethyl 1-[2-(N-4-hydroxyphenylcarbamyl)ethyl]-4-phenylpiperidine-4-carboxylate hydrochloride is obtained following the procedure described in Example 1 using ethyl 4-phenylpiperidine-4-carboxylate and N-(4-hydroxyphenyl)acrylamide.

EXAMPLE 68

Ethyl 4-phenyl-1-[2-(N-4-phenylmercaptophenylcarbamyl)ethyl]piperidine-4-carboxylate hydrochloride is obtained following the procedure described in Example 1 using ethyl 4-phenylpiperidine-4-carboxylate and N-(4-phenylmercaptophenyl)acrylamide.

EXAMPLE 69

Ethyl 1-[2-(N-3-benzylphenylcarbamyl)ethyl]-4-phenylpiperidine-4-carboxylate hydrochloride is obtained following the procedure described in Example 1 using ethyl 4-phenylpiperidine-4-carboxylate and N-(3-benzylphenyl)acrylamide.

EXAMPLE 70

1-(2-carbamylethyl)-4-phenyl-4-piperidinol hydrochloride is obtained following the procedure described in Example 59 using 4-phenyl-4-piperidinol and acrylamide.

EXAMPLE 71

4-phenyl-1-[2-(N-phenylcarbamyl)ethyl]-4-piperidinol hydrochloride is obtained following the procedure described in Example 59 using 4-phenyl-4-piperidinol and N-phenylacrylamide.

EXAMPLE 72

1-[2-(N-ethylcarbamyl)ethyl]-4-phenyl-4-piperidinol hydrochloride is obtained following the procedure described in Example 59 using 4-phenyl-4-piperidinol and N-ethylacrylamide.

EXAMPLE 73

4-phenyl-1-[2-(N-phenylcarbamyl)ethyl]-4-n-propanoyl-piperidine hydrochloride is obtained following the procedure described in Example 57 using 4-phenyl-4-n-propanoylpiperidine and N-phenylacrylamide.

EXAMPLE 74

1-[2-(N-ethylcarbamyl)ethyl]-4-phenyl-4-n-propanoyl-piperidine hydrochloride is obtained following the procedure described in Example 57 using 4-phenyl-4-n-propanoylpiperidine and N-ethylacrylamide.

EXAMPLE 75

4-n-butanoyl-1-[2-(N-methyl-N-phenylcarbamyl)ethyl]-4-phenylpiperidine hydrochloride is obtained following the procedure described in Example 57 using 4-n-butanoyl-4-phenylpiperidine and N-methyl-N-phenylacrylamide.

EXAMPLE 76

Ethyl 4-(3-pyridyl)-1-[2-(N-2-pyridylmethylcarbamyl)-ethyl]piperidine-4-carboxylate hydrochloride is obtained following the procedure described in Example 13 using ethyl 4-(3-pyridyl)piperidine-4-carboxylate and N-(2-pyridylmethyl)acrylamide.

EXAMPLE 77

Ethyl 1-[2-(N-4-methoxyphenethylcarbamyl)ethyl]-4-phenylpiperidine-4-carboxylate hydrochloride is obtained following the procedure described in Example 13 using ethyl 4-phenylpiperidine-4-carboxylate and N-(4-methoxyphenethyl)acrylamide.

EXAMPLE 78

Ethyl 4-phenyl-1-[2-(N-2-phenylpropylcarbamyl)ethyl]-piperidine-4-carboxylate hydrochloride is obtained following the procedure described in Example 13 using ethyl 4-phenylpiperidine-4-carboxylate and N-(2-phenylpropyl)-acrylamide.

EXAMPLE 79

Ethyl 4-phenyl-1-{2-[N-4-(2-thienyl)butylcarbamyl]-ethyl}piperidine-4-carboxylate hydrochloride is obtained following the procedure described in Example 13 using ethyl 4-phenylpiperidine-4-carboxylate and N-[4-(2-thienyl)butyl]acrylamide.

EXAMPLE 80

Ethyl 4-phenyl-1-[2-(N-2-propynylcarbamyl)ethyl]-piperidine-4-carboxylate hydrochloride is obtained following the procedure described in Example 13 using ethyl 4-phenylpiperidine-4-carboxylate and N-(2-propynyl)-acrylamide.

EXAMPLE 81

Ethyl 1-[2-(N-2-butenylcarbamyl)ethyl]-4-phenylpiperidine-4-carboxylate hydrochloride is obtained following the procedure described in Example 13 using ethyl 4-phenylpiperidine-4-carboxylate and N-(2-butenyl)acrylamide.

EXAMPLE 82

Ethyl 1-[2-(N-cyclopentylcarbamyl)ethyl]-4-(2-thienyl)-piperidine-4-carboxylate hydrochloride is obtained following the procedure described in Example 51 using ethyl 4-(2-thienyl)piperidine-4-carboxylate and N-cyclopentyl-acrylamide.

EXAMPLE 83

Ethyl 1-[2-(N-cyclopropylcarbamyl)ethyl]-4-phenylpiperidine-4-carboxylate hydrochloride is obtained following the procedure described in Example 51 using ethyl 4-phenylpiperidine-4-carboxylate and N-cyclopropylacrylamide.

EXAMPLE 84

Ethyl 1-[2-(N-cyclopropylmethylcarbamyl)ethyl]-4-phenylpiperidine-4-carboxylate hydrochloride is obtained following the procedure described in Example 51 using ethyl 4-phenylpiperidine-4-carboxylate and N-cyclopropylmethylacrylamide.

EXAMPLE 85

Ethyl 1-[2-(N-3-cyclopentylpropylcarbamyl)ethyl]-4-(2-pyrimidyl)piperidine-4-carboxylate hydrochloride is obtained following the procedure described in Example 51 using ethyl 4-(2-pyrimidyl)piperidine-4-carboxylate and N-(3-cyclopentylpropyl)acrylamide.

EXAMPLE 86

Ethyl 1-[2-(N-2-cyclohexylethylcarbamyl)ethyl]-4-phenylpiperidine-4-carboxylate hydrochloride is obtained following the procedure described in Example 51 using ethyl 4-phenylpiperidine-4-carboxylate and N-(2-cyclohexylethyl)acrylamide.

EXAMPLE 87

Ethyl 1-[2-(N-cyclohexylmethylcarbamyl)ethyl]-4-phenylpiperidine-4-carboxylate hydrochloride is obtained following the procedure described in Example 51 using ethyl 4-phenylpiperidine-4-carboxylate and N-(cyclohexylmethyl)acrylamide.

EXAMPLE 88

2,6-dimethyl-1-[3-(4-phenyl-4-carbethoxy-1-piperidyl)-propanoyl]piperidine hydrochloride is obtained following the procedure described in Example 52 using ethyl 4-phenylpiperidine-4-carboxylate and N-acrylyl-2,6-dimethylpiperidine.

EXAMPLE 89

3-ethyl-1-[3-(4-phenyl-4-carbethoxy-1-piperidyl)propanoyl]piperidine hydrochloride is obtained following the procedure described in Example 52 using ethyl 4-phenylpiperidine-4-carboxylate and N-acrylyl-3-ethylpiperidine.

EXAMPLE 90

2-methyl-1-[3-(4-phenyl-4-carbethoxy-1-piperidyl)propanoyl]pyrrolidine hydrochloride is obtained following the procedure described in Example 52 using ethyl 4-phenylpiperidine-4-carboxylate and N-acrylyl-2-methylpyrrolidine.

EXAMPLE 91

2,5-dimethyl-1-[3-(4-phenyl-4-carbethoxy-piperidyl)-propanoyl]pyrrolidine hydrochloride is obtained following the procedure described in Example 52 using ethyl 4-phenylpiperidine-4-carboxylate and N-acrylyl-2,5-dimethylpyrrolidine.

EXAMPLE 92

4-methyl-1-[3-(4-phenyl-4-carbethoxy-1-piperidyl)-propanoyl]piperazine hydrochloride is obtained following the procedure described in Example 52 using ethyl 4-phenylpiperidine-4-carboxylate and N-acrylyl-4-methylpiperazine.

EXAMPLE 93

4-[3-(4-phenyl-4-carbethoxy-1-piperidyl) propanoyl]thiomorpholine hydrochloride is obtained following the procedure described in Example 13 using ethyl 4-phenylpiperidine-4-carboxylate and N-acrylylthiomorpholine.

EXAMPLE 94

1-(2-carbamylethyl)-4-phenylpiperidine was obtained as follows: A reaction mixture containing 12 g. of 4-phenylpiperidine, 100 cc. of ethanol and 7.2 g. of acrylamide was heated at reflux for three hours on a steam bath. The alcohol was removed by distilling in vacuo and the remaining material, 1-(2-carbamylethyl)-4-phenylpiperidine, was dissolved in isopropyl alcohol. The isopropyl alcohol solution was treated with hydrogen chloride and the resulting crystalline precipitate was collected and recrystallized from isopropyl alcohol-ethanol to yield 9 g. of 1-(2-carbamylethyl)-4-phenylpiperidine in the form of its hydrochloride, M.P. 201.6–203.2° C. (corr.).

*Analysis.*—Calcd. for $C_{14}H_{20}N_2O \cdot HCl$: Cl, 12.80; N, 10.47. Found: Cl, 13.17; N, 10.33.

EXAMPLE 95

1 - (2 - carbamylethyl) - 4 - phenyl - 1,2,3,6 - tetrahydropyridine hydrochloride is obtained following the procedure described in Example 94 using 4-phenyl-1,2,3,6-tetrahydropyridine and acrylamide.

EXAMPLE 96

1 - [2 - (N - benzyl - N - methylcarbamyl)ethyl]-4-phenyl-1,2,3,6-tetrahydropyridine is obtained following the procedure described in Example 94 using 4-phenyl-1,2,3,6-tetrahydropyridine and N-benzyl-N-methylacrylamide. This compound was also obtained in an attempted acylation of the corresponding 4-piperidinol compound of Example 59 as follows: a mixture containing 15 g. of 1-[3-(N-benzyl-N-methylcarbamyl)ethyl]-4-phenyl-4-piperidinol and 75 g. of n-propanoic anhydride was heated on a steam bath for about six hours. The reaction mixture was then poured into water, washed with sodium bicarbonate solution and extracted with ether. The ether solution was treated with hydrogen chloride and the oily product that separated was allowed to stand for about a month, after which time partial crystallization had resulted. The crystals were separated from the remaining oily material, washed with cold isopropyl alcohol and recrystallized from isopropyl alcohol to yield 3.9 g. of 1-[2-(N-benzyl-N-methylcarbamyl) ethyl]-4-phenyl-1,2,3,6-tetrahydropyridine in the form of its hydrochloride, M.P. 176.2–177.4° C. (corr.).

*Analysis.*—Calcd. for $C_{22}H_{26}N_2O \cdot HCl$: Cl, 9.56; N, 7.55. Found: Cl, 9.80; N, 7.45.

EXAMPLE 97

1 - (2 - carbamylethyl) - 4 - phenyl - 4 - n - propanoyloxypiperidine can be prepared by the following procedure: Dissolve 1-(2-carbamylethyl)-4-phenyl-4-piperidinol in dry chloroform and dry the solution over anhydrous calcium chloride. Filter off the calcium chloride and to the clear solution add a molar equivalent quantity of n-propanoyl chloride. Allow the reaction mixture to stand at room temperature for about 2 hours and remove the chloroform by distilling the mixture on a steam bath at atmospheric pressure. Add ether to the remaining material and allow the mixture to stand overnight in a refrigerator. Decant the ether and boil the remaining material with dry ethyl acetate. Cool the mixture; collect the resulting solid by filtration; and wash the solid first with ethyl acetate and then with dry ether. Dry the resulting solid product in vacuo at 60° C. There is thus obtained 1-(2-carbamylethyl)-4-phenyl-4-n-propanoyloxypiperidine in the form of its hydrochloride.

EXAMPLE 98

4 - phenyl - 1 - [2 - (N - phenyl - N - methylcarbamyl)ethyl]-4-n-propanoyloxypiperidine hydrochloride is obtained following the procedure described in Example 97 using 4-phenyl-1-[2-(N-phenyl-N-methylcarbamyl)ethyl]-4-piperidinol and n-propanoyl chloride.

EXAMPLE 99

4 - acetoxy - 4 - phenyl - 1 - [2 - (N - phenylcarbamyl)ethyl]piperidine hydrochloride is obtained following the procedure described in Example 97 using 4-phenyl-1-[2-(N-phenylcarbamyl)ethyl]-4-piperidinol and acetyl chloride.

EXAMPLE 100

4 - n - butanoyloxy - 1 - [2 - (N - ethylcarbamyl) ethyl]-4-phenylpiperidine hydrochloride is obtained following the procedure described in Example 97 using 1-[2-(N-ethylcarbamyl)ethyl]-4-phenyl-4-piperidinol and n-butanoyl chloride.

EXAMPLE 101

1 - (2 - carbamylethyl) - 4 - ethoxyacetoxy - 4 - phenylpiperidine hydrochloride is prepared following the procedure described in Example 97 using 1-(2-carbamylethyl)-4-phenyl-4-piperidinol and ethoxyacetyl chloride.

EXAMPLE 102

1 - {3 - [4 - (3 - methoxypropanoyloxy) - 4 - phenyl-1-piperidyl]-propanoyl}piperidine hydrochloride is obtained following the procedure described in Example 97 using 1-[3-(4-hydroxy-4-phenyl-1-piperidyl)propanoyl] piperidine and 3-methoxypropanoyl chloride.

EXAMPLE 103

1 - (2 - carbamylethyl) - 4 - ethoxyacetyl - 4 - phenylpiperidine hydrochloride is obtained following the procedure described in Example 57 using 4-ethoxyacetyl-4-phenylpiperidine and acrylamide.

EXAMPLE 104

1 - [2 - (N - ethylcarbamyl)ethyl] - 4 - (3 - methoxypropanoyl)-4-phenylpiperidine hydrochloride is obtained following the procedure described in Example 57 using 4-phenyl-4-(3-methoxypropanoyl)piperidine and N-ethylacrylamide.

EXAMPLE 105

1 - [2 - (N - ethylcarbamyl)ethyl] - 4 - (2 - pyridyl)-1,2,3,6-tetrahydropyridine hydrochloride is obtained following the procedure described in Example 94 using 4-(2-pyridyl)-1,2,3,6-tetrahydropyridine and N-ethylacrylamide.

EXAMPLE 106

1 - [2 - (N - phenylcarbamyl)phenyl] - 4 - phenyl - 1,2,3,6-tetrahydropyridine hydrochloride is obtained following the procedure described in Example 94 using 4-phenyl - 1,2,3,6 - tetrahydropyridine and N-phenylacrylamide.

EXAMPLE 107

4 - phenyl - 1 - [2 - (N - pyridylcarbamyl)ethyl] - 1,2,3,6-tetrahydropyridine hydrochloride is obtained following the procedure described in Example 94 using 4-phenyl-1,2,3,6-tetrahydropyridine and N-(2-pyridyl)acrylamide.

EXAMPLE 108

1 - {3 - [4 - (2 - thienyl) - 1,2,3,6 - tetrahydropyridyl-1]propanoyl}piperidine hydrochloride is obtained following the procedure described in Example 94 using 4-(2-thienyl)-1,2,3,6-tetrahydropyridine and N-acrylylpiperidine.

EXAMPLE 109

1-[3-(4-phenyl-1,2,3,6 - tetrahydropyridyl-1)propanoyl]-pyrrolidine hydrochloride is obtained following the procedure described in Example 94 using 4-phenyl-1,2,3,6-tetrahydropyridine and N-acrylylpyrrolidine.

EXAMPLE 110

2-methyl-1-[3-(4-phenyl - 1,2,3,6 - tetrahydropyridyl-1)-propanoyl]piperidine hydrochloride is obtained following the procedure described in Example 94 using 4-phenyl- 1,2,3,6-tetrahydropyridine and N-acrylyl-2-methylpiperidine.

EXAMPLE 111

1-[2 - (N - methyl-N-phenylcarbamyl)ethyl]-4-phenyl-4-piperidinol hydrochloride is obtained following the procedure described in Example 59 using 4-phenyl-4-piperidinol and N-methyl-N-phenylacrylamide.

EXAMPLE 112

1-[3-(4 - hydroxy-4-phenyl-1-piperidyl)propanoyl]piperidine hydrochloride is obtained following the procedure described in Example 59 using 4-phenyl-4-piperidinol and N-acrylylpiperidine.

EXAMPLE 113

Ethyl 1-(2-carbamylethyl)-4-(3 - methoxyphenyl)piperidine-4-carboxylate hydrochloride is obtained following the procedure described in Example 1 using ethyl 4-(3-methoxyphenyl)piperidine-4-carboxylate and acrylamide.

EXAMPLE 114

1-[2 - (N - ethylcarbamyl)ethyl]-4-(4-methylphenyl)-4-n-propanoylpiperidine hydrochloride is obtained following the procedure described in Example 57 using 4-(4-methylphenyl)-4-n-propanoylpiperidine and N-ethylacrylamide.

EXAMPLE 115

Ethyl 4-(2-methylmercaptophenyl)-1-[2-(N - phenylcarbamyl)-ethyl]piperidine-4-carboxylate hydrochloride is obtained following the procedure described in Example 1 using ethyl 4-(2-methylmercaptophenyl)piperidine-4-carboxylate and N-phenylacrylamide.

EXAMPLE 116

Ethyl 1-(2-carbamylethyl) - 4 - (2-naphthyl)piperidine-4-carboxylate hydrochloride is obtained following the procedure described in Example 1 using ethyl 4-(2-naphthyl)piperidine-4-carboxylate and acrylamide.

EXAMPLE 117

1-(2-carbamylethyl) - 4 - (3,4-dichlorophenyl)piperidine hydrochloride is obtained following the procedure described in Example 94 using 4-(3,4-dichlorophenyl)piperidine and acrylamide.

EXAMPLE 118

1-{3-[4-(4-ethoxyphenyl) - 4 - hydroxy-1-piperidyl]propanoyl}piperidine hydrochloride is obtained following the procedure described in Example 59 using 4-(4-ethoxyphenyl)-4-piperidinol and N-acrylylpiperidine.

EXAMPLE 119

1-(2-carbamylethyl)-4-(3-methoxyphenyl - 1,2,3,6-tetrahydropyridine hydrochloride is obtained following the procedure described in Example 94 using 4-(3-methoxyphenyl-1,2,3,6-tetrahydropyridine and acrylamide.

EXAMPLE 120

1-{3-[4-(2 - oxazolyl)-1-piperidyl]propanoyl}piperidine hydrochloride is obtained following the procedure described in Example 94 using 4-(2-oxazolyl)piperidine and N-acrylylpiperidine.

EXAMPLE 121

1-[2-(N-ethylcarbamyl)ethyl] - 4 - (2-thiazolyl)piperidine hydrochloride is obtained following the procedure described in Example 94 using 4-(2-thiazolyl)piperidine and N-ethylacrylamide.

EXAMPLE 122

4-phenyl-1-[2-(N - phenylcarbamyl)ethyl]piperidine hydrochloride is obtained following the procedure described in Example 94 using 4-phenylpiperidine and N-phenylacrylamide.

EXAMPLE 123

Ethyl 1-(2-carbamylethyl)-3-methyl - 4 - phenylpiperidine-4-carboxylate hydrochloride is obtained following the procedure described in Example 1 using ethyl 3-methyl-4-phenylpiperidine-4-carboxylate and acrylamide.

EXAMPLE 124

1-[2-(N,N-dimethylcarbamyl)ethyl] - 3 - methyl-4-phenyl-4-n-propanoylpiperidine hydrochloride is obtained following the procedure described in Example 57 using 3-methyl-4-phenyl-4-n-propanoylpiperidine and N,N-dimethylacrylamide.

EXAMPLE 125

3-methyl - 4 - phenyl-1-[2-(N - phenylcarbamyl)ethyl]-1,2,3,6-tetrahydropyridine hydrochloride is obtained following the procedure described in Example 94 using 3-methyl-4-phenyl-1,2,3,6-tetrahydropyridine and N-phenylacrylamide.

EXAMPLE 126

1-(2-carbamylethyl)-3-methyl - 4 - (2-triazinyl)-4-piperidinol hydrochloride is obtained following the procedure described in Example 59 using 3-methyl-4-(2-triazinyl-4-piperidinol and acrylamide.

EXAMPLE 127

1-(2-carbamylethyl)-3-methyl - 4 - phenyl-4-n-propanoyloxypiperidine hydrochloride is obtained following the procedure described in Example 97 using 1-(2-carbamylethyl)-3-methyl-4-phenyl - 4 - piperidinol and n-propanoyl chloride.

EXAMPLE 128

1-(2-carbamylethyl) - 4 - phenyl - 4 - n - propanoylpiperidine is obtained following the two step procedure described in Example 40 first using 4-phenyl-4-n-propanoylpiperidine and acrylonitrile, then hydrolyzing the resulting 1-(2-cyanoethyl-4-phenyl-4-n-propanoylpiperidine and converting the resulting free base into its hydrochloride salt.

EXAMPLE 129

1-(3-carbamylpropyl) - 4 - phenyl-4-n-piperidinol is obtained following the two step procedure described in Example 38 first using 4-phenyl-4-piperidinol and 3-cyanopropyl chloride, then hydrolyzing the resulting 1-(3-cyanopropyl)-4-phenyl-4-piperidinol, and converting the resulting 1-(3-carbamylpropyl) free base into its hydrochloride salt.

EXAMPLE 130

1-(3-carbamylpropyl)-4-phenylpiperidine is obtained following the two step procedure described in Example 38 first using 4-phenylpiperidine and 3-cyanopropyl chloride, then hydrolyzing the resulting 1-(3-cyanopropyl)-4-phenylpiperidine, and converting the resulting 1-(3-carbamylpropyl) free base into its hydrochloride salt.

EXAMPLE 131

1-(4-carbamylbutyl) - 4 - phenyl-1,2,3,6-tetrahydropyridine is obtained following the two step procedure described in Example 38 first using 4-phenyl-1,2,3,6-tetrahydropyridine and 4-cyanobutyl chloride, then hydrolyzing the resulting 1-(4-cyanobutyl)-4-phenyl-1,2,3,6-tetrahydropyridine, and converting the resulting 1-(4-carbamylbutyl) free base into its hydrochloride salt.

EXAMPLE 132

Ethyl 1-[2-(N-benzylcarbamyl)ethyl] - 4 - phenylpiperidine-4-carboxylate was prepared as follows: A mixture containing 13.5 g. of ethyl 4-phenylpiperidine-4-carboxylate hydrochloride, 9.85 g. of 2-(N-benzylcarbamyl)ethyl chloride, 20 g. of anhydrous sodium carbonate and 125 cc. of dry n-butanol was heated at reflux temperature for 24 hours. The reaction mixture was then cooled, filtered and the filtrate treated with solid carbon dioxide whereupon no further precipitation resulted. The filtrate was concentrated in vacuo to yield a brown oily material. The oil was dissolved in ether and allowed to stand for about five minutes whereupon a white solid separated. The solid was recrystallized twice by dissolving in a minimum quantity of hot ethanol and adding water to cloudiness. There was thus obtained 8.8 g. of ethyl 1-[2-(N-benzylcarbamyl)ethyl]-4-phenylpiperidine - 4 - carboxylate, M.P. 102.2–104.2° C. (corr.).

*Analysis.*—Calcd. for $C_{24}H_{30}N_2O_3$: C, 73.05; H, 7.67; N, 7.12. Found: C, 72.76; H, 7.71; N, 7.05.

EXAMPLE 133

1-(2-carbamylethyl) - 3 - methyl-4-phenyl-4-piperidinol hydrochloride is obtained following the procedure described in Example 59 using 3-methyl-4-phenyl-4-piperidinol and acrylamide.

The intermediate N-(mono- and di-substituted)-acrylamides used in the foregoing examples are generally known compounds which can be prepared by known procedures, e.g., as illustrated in Examples 8 and 13.

The 1-[carbamyl-(polycarbon - lower-alkyl)]-4-(lower-aromatic)-4-(lower-carbalkoxy, lower - carboxylic - acyl, lower-carboxylic-acyloxy, hydroxy or unsubstituted)-piperidines or 1-[-carbamyl-(polycarbon-lower-alkyl)]-4-(lower-aromatic)-1,2,3,6-tetrahydropyridines of my invention can be formulated in the manner usual for antitussive agents and analgesics. For example, they can be formulated in liquid preparations, e.g., aqueous or aqueous-ethanol menstruum, or in solid form, e.g., tablet or powder. The tablet formulation can be prepared using conventional excipients; and the powder can be formulated in capsule form. These preparations can be administered orally or, in the case of the aqueous preparations of the compounds having analgesic activity, intramuscularly or intravenously. For use as antitussive agents the compounds can be prepared for oral administration as syrups or elixirs by combining the compounds with usual liquid diluents or carriers including, if desired, sweetening and flavoring agents.

I claim:

1. A compound having the formula

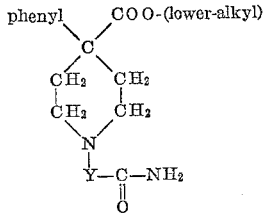

where Y is polycarbon-lower-alkylene.

2. A compound having the formula

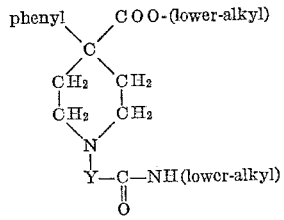

where Y is polycarbon-lower-alkylene.

3. A compound having the formula

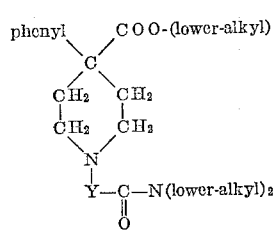

where Y is polycarbon-lower-alkylene.

4. A compound having the formula

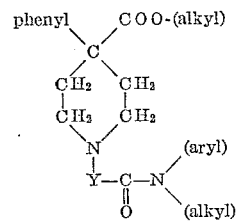

where Y is polycarbon-lower-alkylene and the aryl radical is monocarbocyclic aryl having six ring-carbon atoms.

5. A compound having the formula

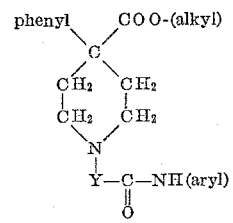

where Y is polycarbon-lower-alkylene and the lower radical is monocarbocyclic aryl having six ring-carbon atoms.

6. A compound having the formula

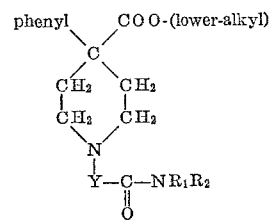

where Y is polycarbon-lower-alkylene and $NR_1R_2$ is 1-piperidyl.

7. A compound of the structural formula

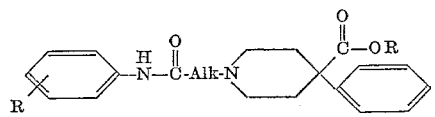

where Alk is a lower alkylene radical, R is a lower alkyl radical, $R_1$ is a member selected from the group consisting of hydrogen, halogen, methoxy, and methyl.

8. Ethyl 1-(2-carbamylethyl)-4-phenylpiperidine-4-carboxylate.

9. Ethyl 1-[2-(N,N - dimethylcarbamyl)ethyl]-4-phenylpiperidine-4-carboxylate.

10. Ethyl 1-[2-(N,N-diethylcarbamyl)ethyl]-4 - phenylpiperidine-4-carboxylate.

11. Ethyl 1-[2-(N-phenylcarbamyl)ether]-4-phenylpiperidine-4-carboxylate.

12. Ethyl 1-[2-(N - methyl-N-phenylcarbamyl)ethyl]-4-phenylpiperidine-4-carboxylate.

13. 1-[3-(4-phenyl-4-carbethoxy-1-piperidyl)propanoyl]-piperidine.

14. 1-[3-(4-phenyl-4-carbethoxy - 1 - piperidyl)propanoyl]-pyrrolidine.

15. 2-methyl-1-[3-(4-phenyl-4-carbethoxy - 1 - piperidyl)propanoyl]piperidine.

16. Ethyl 1 - [2-(N-4-methoxyphenylcarbamyl)ethyl]-4-phenylpiperidine-4-carboxylate.

17. Ethyl 1-[2-(N - 4 - chlorophenylcarbamyl)ethyl]-4-phenylpiperidine-4-carboxylate.

18. A compound of the formula

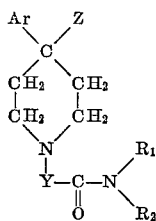

where Ar is aryl selected from the group consisting of phenyl, naphthyl, biphenylyl, pyridyl, pyrimidyl, furyl, thiazolyl, oxazolyl, triazinyl, thienyl, and phenyl substituted by from one to three substituents selected from the group consisting of lower-alkyl, lower-alkoxy, lower-alkylmercapto, lower-alkylsulfinyl, lower-alkylsulfonyl, halo, lower-alkylamino, di-(lower-alkyl)amino, nitro, amino, lower-carboxylic-acylamino, trifluoromethyl, phenoxy, benzyloxy, hydroxy, phenylmercapto, benzyl and 4-methoxyphenoxy; Z is a member selected from the group consisting of lower-carbalkoxy, lower-carboxylic-acyl, lower-carboxylic-acyloxy and hydrogen; Y is polycarbon-lower-alkylene; $R_1$ and $R_2$ are each members selected from the group consisting of hydrogen, lower-alkyl, lower-alkenyl, lower-alkynyl, aryl as defined hereinabove for Ar, aryl-(lower-alkyl) where aryl is defined as above for Ar, lower-cycloalkyl where cycloalkyl has from three to eight ring-carbon atoms, and lower-cycloalkylalkyl where cycloalkyl has from three to eight ring-carbon atoms and alkyl has from one to six carbon atoms, and, further, where $NR_1R_2$ is a radical selected from the group consisting of 1-piperidyl, 1-pyrrolidyl, 4-morpholinyl, 4-thiomorpholinyl, 1-piperazinyl, and said radicals having lower-alkyl ring substituents.

References Cited in the file of this patent
UNITED STATES PATENTS
2,468,012   Isbell _____ May 19, 1949

OTHER REFERENCES

Whitmore et al.: J. Am. Chem. Soc., vol. 66, pages 725 to 731 (1944).

UNITED STATES PATENT OFFICE
CERTIFICATE OF CORRECTION

Patent No. 3,117,139            January 7, 1964

Aram Mooradian

It is hereby certified that error appears in the above numbered patent requiring correction and that the said Letters Patent should read as corrected below.

Column 3, line 53, for "ethyl-4" read -- ethyl 4 --; column 4, line 33, for "(polycarbon-lower-alkyl]" read -- (polycarbon-lower-alkyl)] --; line 55, for "4-Z-piperidines" read -- 4-Z-piperidines" --; line 74, for "sulfurc" read -- sulfuric --; column 6, line 48, for "admistered" read -- administered --; lines 70 and 71, for "administer" read -- administered --; column 7, line 27, for "4-phenylipiperidine" read -- 4-phenylpiperidine --; column 14, line 41, for "4-phenylpiperldine" read -- 4-phenylpiperidine --; column 15, lines 33 and 34, for "9.1 g. or" read -- 9.1 g. of --; column 16, line 8, for "hydrochloric" read -- hydrochloride --; line 44, for "ethyl-4-" read -- ethyl 4- --; line 52, for "isospropyl" read -- isopropyl --; column 17, line 8, for "$C_{23}H_{36}N_2O_3 \cdot Cl$" read -- $C_{23}H_{36}N_2O_3 \cdot HCl$ --; line 20, for "1-[2-(n-allylcarbamyl)" read -- 1-[2-(N-allylcarbamyl) --; column 18, line 2, for "methtod" read -- method --; line 37, for "propanoyl]3piperidine" read -- propanoyl]piperidine --; column 20, line 27, for "(4-biphenyl)" read -- (4-biphenylyl) --; column 22, lines 57 and 58, for "carbethoxy-piperidyl)" read -- carbethoxy-1-piperidyl) --; column 24, line 54, for "(N-pyridylcarbamyl)" read -- (N-2-pyridylcarbamyl)--; column 25, line 51, for "(3-methoxyphenyl-" read -- (3-methoxyphenyl)- --; lines 54 and 55, for "(3-methoxyphenyl-" read -- (3-methoxyphenyl)- --; line 65, for "(2-thiazolylpiperidine" read -- (2-thiazolyl)-piperidine --; column 26, line 20, for "(2-triazinyl-4" read -- (2-triazinyl)-4 --; line 34, for "(2-cyanoethyl-4" read -- (2-cyanoethyl)-4 --; line 38, for "4-n-piperidinol" read -- 4-piperidinol --; column 28, in the formula of claim 4, for "alkyl", both occurrences, read -- lower-alkyl --; same column 28, in the formula of claim 5, for "alkyl" read -- lower-alkyl --; same column 28, lines 28 and 29, for "the lower radical" read -- the aryl radical --; same column, line 62, for "(N-phenylcarbamyl)ether]" read -- (N-phenylcarbamyl)ethyl --.

Signed and sealed this 7th day of July 1964.

(SEAL)
Attest:

ERNEST W. SWIDER            EDWARD J. BRENNER

Attesting Officer            Commissioner of Patents